(12) United States Patent
Chien et al.

(10) Patent No.: US 7,329,465 B2
(45) Date of Patent: Feb. 12, 2008

(54) OPTICAL FILMS INCORPORATING CYCLIC OLEFIN COPOLYMERS

(75) Inventors: Bert T. Chien, St. Paul, MN (US); Joan M. Strobel, Maplewood, MN (US); Mark A. Strobel, Maplewood, MN (US); Clinton L. Jones, Somerset, WI (US); Joel A. Getschel, Osceola, WI (US); Ellen R. Bosl, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 426 days.

(21) Appl. No.: 10/976,675

(22) Filed: Oct. 29, 2004

(65) Prior Publication Data

US 2006/0093845 A1 May 4, 2006

(51) Int. Cl.
*B32B 27/08* (2006.01)

(52) U.S. Cl. .............. 428/517; 428/519; 428/520; 428/521; 428/522; 428/523

(58) Field of Classification Search ........... 428/517, 428/519, 520, 521, 522, 523
See application file for complete search history.

(56) References Cited

U.S. PATENT DOCUMENTS

| | | |
|---|---|---|
| 540,768 A | 6/1895 | Western |
| 3,124,639 A | 3/1964 | Kahn |
| 3,610,729 A | 10/1971 | Rogers |
| 3,711,176 A | 1/1973 | Alfrey, Jr. et al. |
| 3,860,036 A | 1/1975 | Newman, Jr. |
| 4,264,664 A | 4/1981 | Kunz |
| 4,367,312 A | 1/1983 | Bontinck et al. |
| 4,446,305 A | 5/1984 | Rogers et al. |
| 4,520,189 A | 5/1985 | Rogers et al. |
| 4,521,588 A | 6/1985 | Rogers et al. |
| 4,525,413 A | 6/1985 | Rogers et al. |
| 4,720,426 A | 1/1988 | Englert et al. |
| 4,735,632 A | 4/1988 | Oxman et al. |
| 4,751,138 A | 6/1988 | Tumey et al. |
| 4,837,088 A | 6/1989 | Freedman |
| 4,950,696 A | 8/1990 | Palazotto |
| 4,985,340 A | 1/1991 | Palazotto |

(Continued)

FOREIGN PATENT DOCUMENTS

EP  0 345 884  12/1989

(Continued)

OTHER PUBLICATIONS

Topas® Cyclic Olefin Copolymers—Cost Effective Plymers for Demanding Optical Applications. © 2001.
McNally, D., Cyclic Olefin Copolymer, *Modern Plastics 2001 World Encyclopedia*, p. B-8. 2001.

(Continued)

*Primary Examiner*—D. S Nakarani

(57) ABSTRACT

A norbornene-based cyclic olefin layer with a curable layer disposed thereon is described. The curable layer may additionally be imparted with a texture. The norbornene-based cyclic olefin films with curable layers can be incorporated into optical bodies which include an optical film, such as an oriented multilayer optical film. In addition, the invention includes a method of coating a curable layer onto a norbornene-based polymer layer or film without requiring a primer layer. Methods of making the norbornene-based cyclic olefin layer containing films are also disclosed.

26 Claims, 4 Drawing Sheets

U.S. PATENT DOCUMENTS

| | | |
|---|---|---|
| 5,063,096 A | 11/1991 | Kohara et al. |
| 5,091,250 A | 2/1992 | Chum et al. |
| 5,175,030 A | 12/1992 | Lu et al. |
| 5,183,597 A | 2/1993 | Lu et al. |
| 5,188,760 A | 2/1993 | Hikmet et al. |
| 5,211,878 A | 5/1993 | Reiffenrath et al. |
| 5,213,852 A | 5/1993 | Arakawa et al. |
| 5,235,443 A | 8/1993 | Barnik et al. |
| 5,256,170 A | 10/1993 | Harmer et al. |
| 5,262,894 A | 11/1993 | Wheatley et al. |
| 5,269,995 A | 12/1993 | Ramanathan et al. |
| 5,294,657 A | 3/1994 | Melendy et al. |
| 5,316,703 A | 5/1994 | Schrenk |
| 5,319,478 A | 6/1994 | Füfschilling et al. |
| 5,339,198 A | 8/1994 | Wheatly et al. |
| 5,389,324 A | 2/1995 | Lewis et al. |
| 5,437,926 A | 8/1995 | Takahashi et al. |
| 5,448,404 A | 9/1995 | Schrenk et al. |
| 5,486,935 A | 1/1996 | Kalmanash |
| 5,486,949 A | 1/1996 | Schrenk et al. |
| 5,520,760 A | 5/1996 | Freedman |
| 5,534,606 A | 7/1996 | Bennett et al. |
| 5,552,927 A | 9/1996 | Wheatly et al. |
| 5,612,820 A | 3/1997 | Schrenk et al. |
| 5,629,055 A | 5/1997 | Revol et al. |
| 5,674,122 A | 10/1997 | Krech |
| 5,686,979 A | 11/1997 | Weber et al. |
| 5,699,188 A | 12/1997 | Gilbert et al. |
| 5,721,603 A | 2/1998 | De Vaan et al. |
| 5,744,534 A | 4/1998 | Ishiharada et al. |
| 5,751,388 A | 5/1998 | Larson |
| 5,753,754 A | 5/1998 | Strobel et al. |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,807,619 A | 9/1998 | Freedman |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,867,316 A | 2/1999 | Carlson et al. |
| 5,882,774 A | 3/1999 | Jonza et al. |
| 5,891,967 A | 4/1999 | Strobel et al. |
| 5,900,317 A | 5/1999 | Strobel et al. |
| 5,914,073 A | 6/1999 | Kobayashi et al. |
| 5,914,165 A | 6/1999 | Freedman |
| 5,940,149 A | 8/1999 | Vanderwerf |
| 5,962,114 A | 10/1999 | Jonza et al. |
| 5,965,247 A | 10/1999 | Jonza et al. |
| 5,981,076 A | 11/1999 | Ojeda |
| 6,141,149 A | 10/2000 | Carlson et al. |
| 6,157,486 A | 12/2000 | Benson et al. |
| 6,185,039 B1 | 2/2001 | Allen et al. |
| 6,210,785 B1 | 4/2001 | Weber et al. |
| 6,262,842 B1 | 7/2001 | Ouderkirk et al. |
| 6,268,961 B1 | 7/2001 | Nevitt et al. |
| 6,296,927 B1 | 10/2001 | Jonza et al. |
| 6,307,676 B1 | 10/2001 | Merrill et al. |
| 6,329,046 B1 | 12/2001 | Merrill et al. |
| 6,335,051 B1 | 1/2002 | Kausch et al. |
| 6,352,761 B1 | 3/2002 | Hebrink et al. |
| 6,352,762 B1 | 3/2002 | Shimizu et al. |
| 6,368,699 B1 | 4/2002 | Gilbert et al. |
| 6,396,631 B1 | 5/2002 | Ouderkirk |
| 6,406,763 B1 | 6/2002 | Wolf et al. |
| 6,407,862 B2 | 6/2002 | Moshrefzadeh |
| 6,449,092 B1 | 9/2002 | Weber et al. |
| 6,449,093 B2 | 9/2002 | Hebrink et al. |
| 6,451,414 B1 | 9/2002 | Wheatley et al. |
| 6,459,514 B2 | 10/2002 | Gilbert et al. |
| 6,486,997 B1 | 11/2002 | Bruzzone et al. |
| 6,498,683 B2 | 12/2002 | Condo et al. |
| 6,543,143 B2 | 4/2003 | Moore et al. |
| 6,543,153 B1 | 4/2003 | Weber et al. |
| 6,552,145 B1 | 4/2003 | Okada et al. |
| 6,590,707 B1 | 7/2003 | Weber |
| 6,654,085 B1 | 11/2003 | Koike et al. |
| 6,654,170 B1 | 11/2003 | Merrill et al. |
| 6,673,425 B1 | 1/2004 | Hebrink et al. |
| 6,760,157 B1 | 7/2004 | Allen et al. |
| 6,780,519 B1 | 8/2004 | Strobel et al. |
| 6,797,396 B1 | 9/2004 | Liu et al. |
| 6,804,058 B1 | 10/2004 | Ouderkirk et al. |
| 6,967,778 B1 | 11/2005 | Wheatley et al. |
| 2001/0013668 A1 | 8/2001 | Neavin et al. |
| 2002/0034634 A1 | 3/2002 | Denehy et al. |
| 2003/0062114 A1 | 4/2003 | Yamaguchi et al. |
| 2003/0103180 A1 | 6/2003 | Masuda et al. |
| 2003/0179460 A1 | 9/2003 | Hino et al. |
| 2006/0057410 A1 | 3/2006 | Saavedra et al. |
| 2006/0093809 A1 | 5/2006 | Hebrink et al. |
| 2006/0159888 A1 | 7/2006 | Hebrink et al. |
| 2006/0182896 A1 | 8/2006 | Murakami et al. |

FOREIGN PATENT DOCUMENTS

| | | |
|---|---|---|
| EP | 06825061 | 11/1995 |
| EP | 1 375 112 A2 | 1/2004 |
| JP | 61-40178 | 9/1986 |
| JP | 06-312467 | 11/1994 |
| JP | 11-77916 | 3/1999 |
| JP | 2000/241627 | 8/2000 |
| JP | 2000301649 A | 10/2000 |
| JP | 2001030351 A | 2/2001 |
| JP | 2001281454 | 10/2001 |
| JP | 2002267844 | 9/2002 |
| JP | 2002/105219 | 10/2002 |
| JP | 2002355913 A | 12/2002 |
| JP | 2004-34503 | 2/2004 |
| JP | 2004122701 | 4/2004 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 95/27919 | 10/1995 |
| WO | WO 96/19347 | 6/1996 |
| WO | WO 97/01440 | 1/1997 |
| WO | WO 97/01774 | 1/1997 |
| WO | WO 99/36248 | 7/1999 |
| WO | WO 99/36257 | 7/1999 |
| WO | WO 99/36262 | 7/1999 |
| WO | WO 99/36729 | 7/1999 |
| WO | WO 99/36809 | 7/1999 |
| WO | WO 99/36812 | 7/1999 |
| WO | WO 00/75560 | 12/2000 |
| WO | WO 01/38448 | 5/2001 |
| WO | WO 01/40708 | 6/2001 |
| WO | WO 01/79340 | 10/2001 |
| WO | WO 01/96104 | 12/2001 |
| WO | WO 02/16976 | 2/2002 |
| WO | WO 02/31539 | 4/2002 |
| WO | WO 02/34514 | 5/2002 |
| WO | WO 2004/099832 | 11/2004 |

OTHER PUBLICATIONS

High Performance Optical Film, Zeonor Film, presentation by Optes Inc. Jun. 2003.

Lamonte et al., Uses and Processing of Cyclic Olefin Copolymers (COC), Plastic Engineering, vol. 56, No. 6, pp. 51ff, Jun. 2000.

Schrenk et al., Nanolayer polymeric optical films, Tappi Journal, pp. 169-174, Jun. 1992.

Weber et al., "Giant Birefringement Optics in Multilayer Polymer Mirrors", Science, vol. 287, Mar. 31, 2000, pp. 2451-2456.

PCT Search Rerport on PCT/US2004/0011197, Jul. 21, 2004.

Lamonte et al., Uses and Processing of Cyclic Olefin Copolymers (COC), Plastic Engineering, vol. 56 No. 6, pp. 51ff, Jun. 2000.

OPTICAL FILMS INCORPORATING CYCLIC OLEFIN COPOLYMERS

BACKGROUND OF THE INVENTION

Multilayer polymeric optical films are widely used for various purposes, including as mirrors and polarizers. The films are well suited for use as reflectors and polarizers in compact electronic displays, including as liquid crystal displays (LCDs) placed in mobile telephones, personal data assistants, notebook computers, monitors and televisions.

Although polymeric optical films can have favorable optical and physical properties, one limitation with some such films is that they may show dimensional instability when exposed to fluctuations in temperature—even the temperature fluctuations experienced in normal use. This dimensional instability can result in formation of wrinkles in the film, which may be visible in LCDs as shadows. Such dimensional instability can at times be observed for some types of films when temperatures approach or exceed approximately 85° C. Dimensional instability is also observed when some types of films are cycled to high temperature and high humidity conditions, such as conditions of 60° C. and 70 percent relative humidity.

SUMMARY OF THE INVENTION

The invention is directed to multilayer films comprising an additional curable layer coated on a norbornene-based cyclic olefin film, optical bodies comprising at least one norbornene-based cyclic olefin layer disposed on an optical film, and methods of improving adhesion between norbornene-based cyclic olefin layers or films and other materials.

One embodiment of the present disclosure is a multilayer film comprising a norbornene-based cyclic olefin film and a curable layer attached to the norbornene-based cyclic olefin film. The curable layer comprises a curable material.

Another embodiment of the present disclosure is an optical body comprising an optical film, at least one norbornene-based cyclic olefin layer disposed on the optical film, and at least one curable layer comprising a curable material attached to the norbornene-based cyclic olefin layer. In one exemplary implementation, the at least one curable layer comprising a curable material is attached to a major surface of at least one norbornene-based cyclic olefin layer, wherein the major surface is disposed generally opposite the optical film. In another exemplary implementation, the at least one curable layer comprising a curable material is disposed between the optical film and at least one norbornene-based cyclic olefin layer.

Another exemplary implementation of the present disclosure is a method of applying a curable layer to a norbornene-based cyclic olefin film, which includes corona treating a norbornene-based cyclic olefin film, applying a curable material to the corona-treated norbornene-based cyclic olefin film, thereby forming a curable layer.

Yet another exemplary implementation of the present disclosure is a method of making an optical body, wherein the optical body comprises an optical film. The method comprises providing an optical film comprising at least one norbornene-based cyclic olefin outer layer, corona treating the norbornene-based cyclic olefin layer and coating a curable layer on the norbornene-based cyclic olefin layer.

BRIEF DESCRIPTION OF THE DRAWINGS

The invention will be further explained with reference to the drawings.

DETAILED DESCRIPTION OF THE PREFERRED EMBODIMENT

Figure 1:
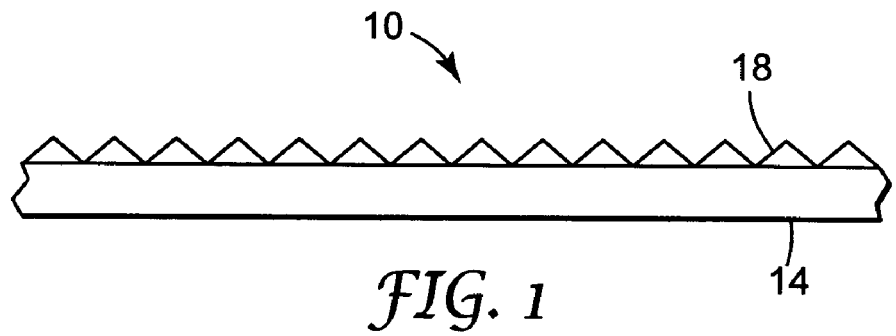
FIG. 1 is a side elevational view of a multilayer film constructed and arranged in accordance with a first implementation of the present disclosure, showing a norbornene-based cyclic olefin layer and a curable layer.

Norbornene-based cyclic olefin copolymer films exhibit properties suitable for use in optical films. These films are optically transparent, clear, have good light stability, and have very low birefringence. Additionally, their high stiffness, temperature resistance and very low moisture absorption suggest them for use as dimensionally stable layers for optical applications. However, norbornene-based cyclic olefin copolymers are sometimes difficult to adhere to other materials. In particular, they are relatively difficult to adhere to curable polymeric materials including curable adhesives useful for film lamination and curable coating materials. Typically a coated primer layer, such as a chemical adhesion-promoting layer or adhesion-promoting tie layer, is required on the surface of norbornene-based cyclic olefin copolymer films to develop adhesion to curable materials. The use of a coated primer layer, however can result in added manufacturing cost and can increase the likelihood of objectionable coating defects.

A method for improving adhesion in structures comprising norbornene-based cyclic olefin layers and films, including multilayer polymeric optical films, is needed. It is desirable to directly adhere additional layers to norbornene-based cyclic olefin layers and films by film lamination with curable adhesives without the use of coated primer layers. It is also desirable to directly adhere additional layers composed of curable materials without coated primer layers. Methods for producing multi-layer optical films through the use of an in-line surface-modification technology that do not require the use of primer layers would reduce manufacturing costs and eliminate defects from a primer layer.

As stated above, the present invention provides a multi-layer film that incorporates at least one norbornene-based cyclic olefin layer. The multilayer film can be an optical body containing an optical film and one or more norbornene-based cyclic olefin layers. An adhesive layer, including a curable adhesive layer, can be between the optical film and norbornene-based cyclic olefin layer. A curable layer can be applied to the norbornene-based cyclic olefin layer as a surface coating layer. In another embodiment, the present invention provides a norbornene-based cyclic olefin film with a curable layer coated thereon.

Norbornene-based cyclic olefin copolymers are unique materials that show promise in a number of electronic, optical, and display applications. They are optically transparent, clear, have good light stability and have very low birefringence. They are also dimensionally stable (i.e., glass transition temperature ranges from, e.g., ~100-160° C., high stiffness and very low moisture absorption). A limitation of norbornene-based cyclic olefin copolymers however has been the difficulty of generating adhesion between norbornene-based cyclic olefin copolymers and other materials.

Norbornene-based cyclic olefin layers applied to optical films provide dimensional stability and resistance to warping of the optical film. Norbornene-based cyclic olefin layers are flexible, yet still provide sufficient stability. The optical body that is formed is typically flexible, such that the optical body can be processed using typical handling equipment, and not fragile. In this regard, inclusion of one or more norbornene-based cyclic olefin layers in an optical body will resist forming wrinkles and waves in the optical body, while still allowing easy handling and storage of the optical body, such as by being retained on a roll. The addition of one or more norbornene-based cyclic olefin layers in an optical body also provides additional resistance to deterioration of the optical body in extreme temperature ranges, particularly high temperatures, and increased humidity conditions. The addition of one or more norbornene-based cyclic olefin layers in an optical body typically permits an optical body to be repeatedly cycled through a temperature of −35° C. to 85° C. every 2 hours for 192 hours without significant deterioration. These cycling tests are designed to be indicative of long term stability under expected use conditions in an LCD display or other device.

One or more norbornene-based cyclic olefin layers may be applied to optical films to improve dimensional stability and resistance to warping. Norbornene-based cyclic olefin layers are useful with optical films in liquid crystal displays, as light diffusers, as a protective film for absorptive polarizers, and as compensation films. A norbornene-based cyclic olefin layer can be added to each major surface (i.e. both faces or sides) of the optical film, but also may be placed on only one major surface (i.e. one side).

In addition, a norbornene-based cyclic olefin layer can also serve as the base substrate upon which a curable surface coating is applied. The curable surface coating may additionally be textured or structured, in conjunction with the curing process. Certain optical products having structured surfaces are described in U.S. Pat. Nos. 5,175,030 and 5,183,597, the disclosures of which are incorporated by reference herein. Textured and surface-structured films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Textured and surface-structured films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

The present disclosure also provides methods for forming multi-layer films comprising one or more norbornene-based cyclic olefin layers with improved adhesion between norbornene-based cyclic olefin copolymers and other materials. A method for applying a curable layer to a norbornene-based cyclic olefin film and/or a multi-layer film with at least one norbornene-based cyclic olefin layer, without coextrusion of the norbornene-based cyclic olefin, is also described.

In the method of the present disclosure, norbornene-based cyclic olefin layers are corona treated immediately or shortly prior to the coating and curing of a curable material. This method can be combined in-line with typical curing and surface texturing or surface-structuring processes. The method improves the adhesion between norbornene-based cyclic olefin copolymers and curable materials. Surface treatments such as corona discharge are thin, typically less than 10 nm, such that the optical properties of a treated substrate are not adversely affected.

One or more norbornene-based cyclic olefin layers may be applied to optical films to improve dimensional stability and resistance to warping. Norbornene-based cyclic olefin layers are useful with optical films suitable for LCD displays, such as multilayer reflectors, reflective polarizers, diffusers/plate applications, protective films for absorptive polarizers, and compensation films.

Reference is now made to FIGS. 1 through 6, which show various general embodiments of multilayer films and optical bodies of the present disclosure. Optical bodies are multi-layer films comprising an optical film. In FIG. 1, multilayer film 10 includes a norbornene-based cyclic olefin layer 14, and a curable surface layer 18. Curable surface layer 18 is presented with optional texture.

Figure 2:
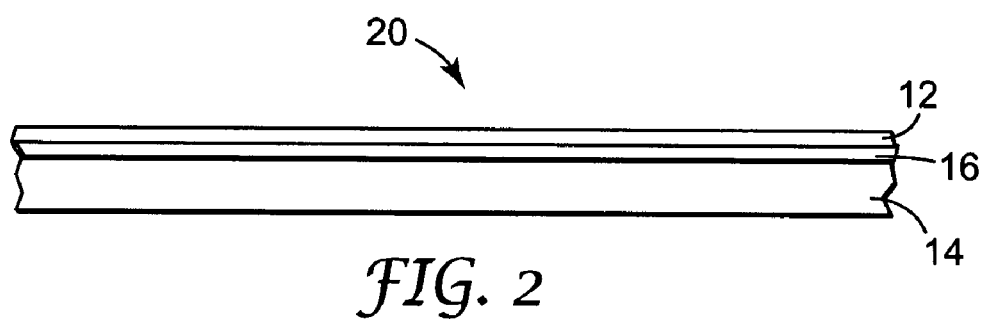
FIG. 2 is a side elevational view of an optical body constructed and arranged in accordance with a second implementation of the present disclosure, showing an optical body with an optical film, a norbornene-based cyclic olefin layer, and an adhesive layer.

In FIG. 2, optical body 20 includes an optical film 12, a norbornene-based cyclic olefin layer 14, and an adhesive layer 16. The three layers in the example depicted in FIG. 2 show the thickest layer being the norbornene-based cyclic olefin layer 14, followed in thickness by the optical film 12 and the adhesive layer 16. However, the layers can be constructed to have different relative thicknesses than those shown in FIG. 2. Thus, the optical film 12 can optionally be of greater thickness than the norbornene-based cyclic olefin layer 14.

Figure 3:
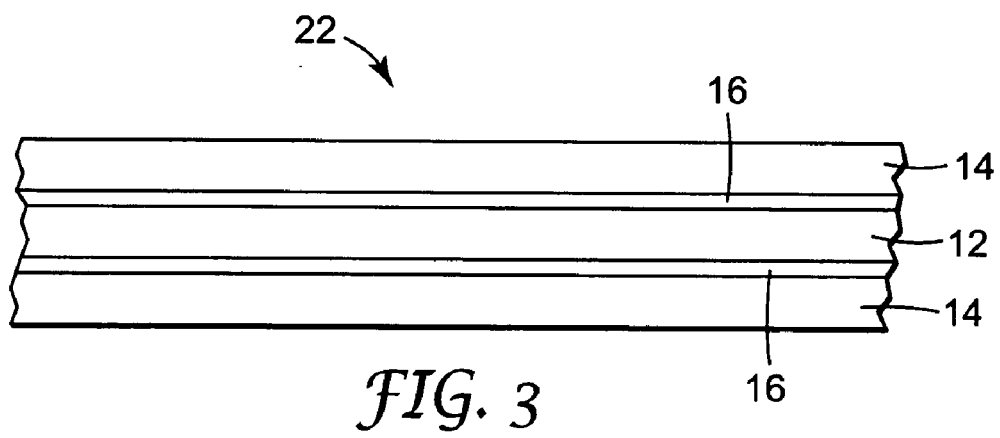
FIG. 3 is a side elevational view of an optical body constructed and arranged in accordance with a third implementation of the present disclosure, showing an optical body with two adhesive layers and two norbornene-based cyclic olefin layers.

FIG. 3 shows a further implementation of the present disclosure of an optical body 22 with one optical film 12 and two norbornene-based cyclic olefin layers 14. Optical body 22 also includes two adhesive layers 16.

Figure 4:
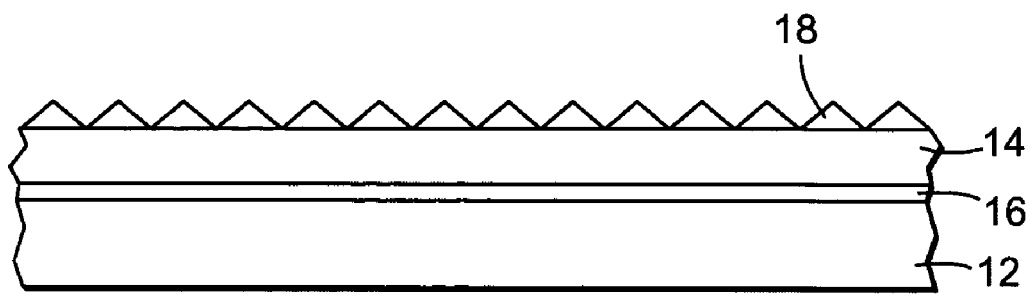
FIG. 4 is a side elevational view of an optical body constructed and arranged in accordance with a fourth implementation of the present disclosure, showing an optical body with an optical film, a norbornene-based cyclic olefin layer, an adhesive layer, and a curable layer on the norbornene-based cyclic olefin layer.
Figure 5:
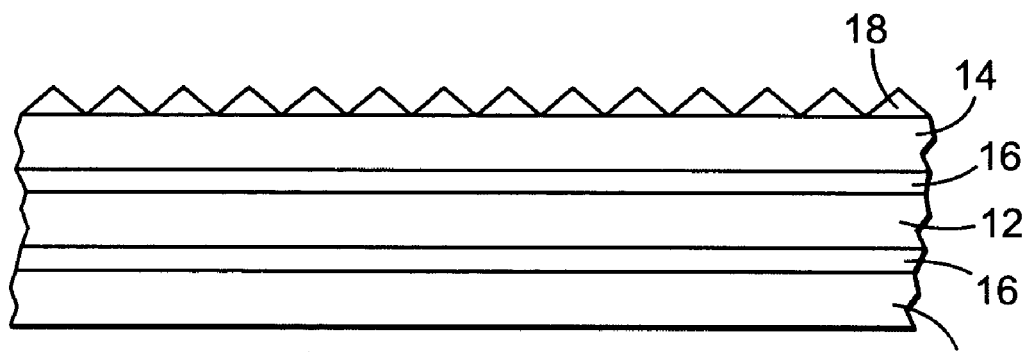
FIG. 5 is a side elevational view of an optical body constructed and arranged in accordance with a fifth implementation of the present disclosure, showing an optical body with an optical film, two adhesive layers, two norbornene-based cyclic olefin layers, and a curable surface layer.
Figure 6:
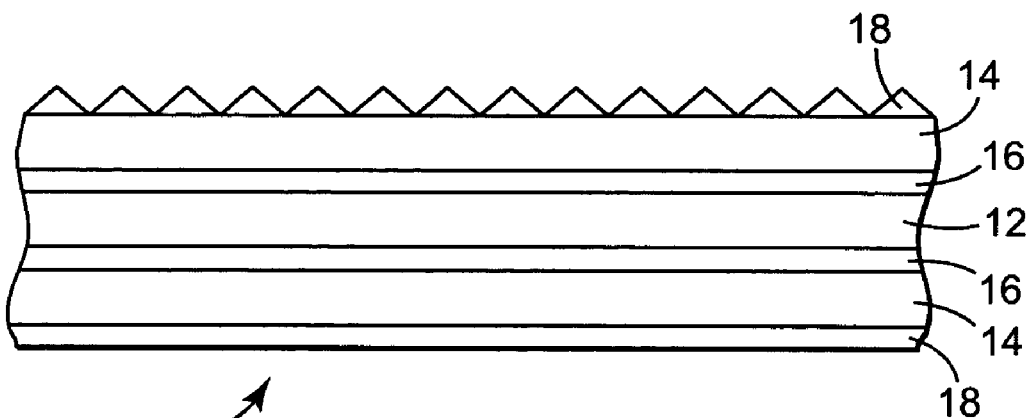
FIG. 6 is a side elevational view of an optical body constructed and arranged in accordance with a sixth implementation of the present disclosure, showing an optical body with an optical film, two adhesive layers, two norbornene-based cyclic olefin layers, and two curable surface layers on the norbornene-based cyclic olefin layers.

In FIG. 4, an optical body 24 includes an optical film 12, an adhesive layer 16, a norbornene-based cyclic olefin film 14 and a curable layer 18. FIG. 5 shows an optical body 26 with one optical film 12, two adhesive layers 16, two norbornene-based cyclic olefin layers 14, and a curable layer 18. FIG. 6 shows optical body 28, wherein an optical film 12, on each of its two major surfaces, has an adhesive layer 16, a norbornene-based cyclic olefin film 14 and a curable layer 18.

These various components, along with methods of making the multilayer films comprising one or more norbornene-based cyclic olefin layers, for example optical bodies of the present disclosure, are described below.

The term "polymer" will be understood to include homopolymers and copolymers, as well as polymers or copolymers that may be formed in a miscible blend, for example, by coextrusion or by reaction, including, for example, transesterification. The terms "polymer", "copolymer", and "copolyester" include both random and block copolymers.

The term "film" is generally used to refer to single layer and multilayer polymeric solid or finished forms. Although, use of the term "film" does not bar application of additional layers or processes. "Layers" refer to portions of multilayer films, materials prior to reaching the desired finished form, as well as the solid and finished forms of the structures within the present disclosure. A single or multilayer structure may also be referred to as a film. Materials and methods described in the present disclosure apply equally to films and layers.

Norbornene-based Cyclic Olefin Film and Layer

Norbonene-based cyclic olefin layer includes norbomene-based polymers, such as, polymers, copolymers and polymer blends wherein one or more polymers contain norbomene or a norbomene-derivative. The properties described for layers (generally, one or more layers in or on a multilayer film), also apply to films (an independent norbomene-based cyclic olefin layer, not otherwise or yet associated with additional materials). Generally, the norbornene-based cyclic olefin layer is a co-polymer comprising a norbomene-based copolymer. In this context, the term "copolymer" includes polymers having two or more different monomeric units. Example monomers for norbornene-based copolymers include: norbornene, 2-norbornene (e.g., produced by reacting ethylene and dicyclopentadiene), and derivatives thereof, polymerized with an olefin, such as ethylene. Ring-opening polymers based on dicyclopentadiene or related compounds may also be used. Norbornene derivatives include alkyl, alkylidene, and aromatic substituted derivatives, as well as halogen, hydroxy, ester, alkoxy, cyano, amide, imide and silyl substituted derivatives.

Additional examples of monomers that can be used to form norbornene-based copolymers include: 2-norbornene, 5-methyl-2-norbornene, 5,5-dimethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, and 5-phenyl-2-norbornene. Polymers of cyclopentadienes, and derivatives thereof, for example, dicyclopentadiene, and 2,3,-dihydrocyclopentadiene are also examples.

Commercially available norbornene-based copolymer blends include: Topas® polymers available from Ticona, Summit, N.J.; Zeonor® polymers available from Zeon Chemicals, Louisville, Ky.; Apel® from Mitsui Chemicals, Inc., Tokyo, Japan; and Arton® from JSR Corporation, Japan. Increasing the norbornene component of the copolymer increases the glass transition temperature, Tg. It has been found particularly useful that different grades of norbomene-based copolymers having high and low Tg's can be blended to adjust the composite Tg.

The polymer composition of the norbomene-based cyclic olefin layer is preferably selected such that is substantially stable at temperatures from at least about −35° C. to 85° C. The norbomene-based cyclic olefin layer is normally flexible, but does not significantly expand in length or width over the temperature range of −35° C. to 85° C. To the minimal extent that the norbomene-based optical layer does expand over this temperature range, the expansion is substantially uniform such that the film does not show excessive wrinkling.

The norbomene-based cyclic olefin layer typically includes, as a primary component, a norbornene-based cyclic olefin copolymer material exhibiting a $T_g$ from 80 to 200° C., more typically from 100 to 160° C. In some embodiments, the norbornene-based cyclic olefin copolymer is selected such that it can be extruded and remains transparent after processing at high temperatures. A norbornene-based cyclic olefin film or layer is normally transparent or substantially transparent.

Various blends of Topas® polymers were prepared and evaluated by dynamic mechanical analysis. They are presented in Table 1. Each sample was scanned from 0 to 180° C. at a modulation frequency of 0.1 Hertz to determine the modulus as a function of temperature and $T_g$. The composition and physical properties of the norbornene-based copolymer blends are presented in Table 1.

TABLE 1

| Sample Composition (wt. %/wt. %) | Modulus (25° C.) (GPa) | Modulus (85° C.) (GPa) | $T_g$ (° C.) |
| --- | --- | --- | --- |
| 45/55 Topas ® 8007/6013 | 2.18 | 1.21 | 99.0 |
| 30/70 Topas ® 8007/6013 | 2.21 | 1.63 | 110.0 |
| 15/85 Topas ® 8007/6013 | 2.20 | 1.59 | 124.0 |
| Topas ® 6013 | 2.46 | 1.91 | 137.0 |

The norbornene-based cyclic olefin layer can be formed such that a texture is imparted during manufacture. The imparted texture can provide light diffusing properties to the norbomene-based cyclic olefin layer by forming a matte or rough surface. The imparted texture also can roughen the surface of the norbomene-based cyclic olefin layer to lower the coefficient of friction of the film thus reducing the tendency of the film to adhere or couple to adjacent surfaces such as glass or other rigid films.

The thickness of a norbornene-based cyclic olefin layer can vary depending upon the application. However, a norbomene-based cyclic olefin layer is typically from 0.1 to 10 mils (about 2 to 250 micrometers) thick.

Additional Curable Layers

In some exemplary embodiments, an additional curable layer is attached to a norbomene-based cyclic olefin film, or attached to one or more norbomene-based cyclic olefin layers of a multilayer film or optical body. The curable layer comprises a curable material, which usually contains precursor polymer subunits. Curable material is chosen in order to be compatible with the norbornene-based cyclic olefin layer and/or any other layers, for example optical film, that the curable layer contacts. The curable material which contains precursor polymer subunits is capable of flowing sufficiently so as to be able to coat a surface. Solidification of the curable material which contains precursor polymer subunits is achieved by curing (e.g., polymerization and/or cross-linking). Additional processes in conjunction with curing such as drying (e.g., driving off a liquid) and/or cooling can also be applicable.

Precursor polymer subunits

The precursor polymer subunits are preferably polymer subunits (e.g., monomers) or polymers (e.g., resin) that are radiation energy curable. Radiation energy curable materials, including the precursor polymer subunits, are capable of polymerizing and/or crosslinking upon exposure to heat and/or other sources of energy, such as electron beam, ultraviolet light, visible light, etc. Chemical catalysts, moisture, or other agents may also be combined with exposure to an energy source to cause monomers to polymerize and/or polymers to crosslink.

The precursor polymer subunits may be an organic solvent-borne, a water-borne, or a 100% solids (i.e., a substantially solvent-free) composition. The curable layer is coated as a solution that can include monomers, oligomers, polymers, or combinations thereof. Both thermoplastic and/or thermosetting polymers, as well as combinations thereof, maybe used as precursor polymer subunits. Upon the curing of the precursor polymer subunits, the curable subunits are converted into a cured polymer layer. The preferred precursor polymer subunits can be either condensation curable or addition polymerizable. The addition polymerizable materials can be ethylenically unsaturated monomers and/or oligomers. Examples of useable crosslinkable materials include phenolic resins, bismaleimide binders, vinyl ether resins, aminoplast resins having pendant alpha, beta unsaturated carbonyl groups, urethane resins, epoxy resins, acrylate resins, acrylated isocyanurate resins, urea-formaldehyde resins, isocyanurate resins, acrylated urethane resins, acrylated epoxy resins, or mixtures thereof.

Precursor polymer subunits examples include amino polymers or aminoplast polymers such as alkylated urea-formaldehyde polymers, melamine-formaldehyde polymers, and alkylated benzoguanamine-formaldehyde polymer, acrylate polymers including acrylates and (meth)acrylates alkyl acrylates, acrylated epoxies, acrylated urethanes, acrylated polyesters, acrylated polyethers, vinyl ethers, acrylated oils, and acrylated silicones, alkyd polymers such as urethane alkyd polymers, polyester polymers, reactive urethane polymers, phenolic polymers such as resole and novolac polymers, phenolic/latex polymers, epoxy polymers such as bisphenol epoxy polymers, isocyanates, isocyanurates, polysiloxane polymers including alkylalkoxysilane polymers, or reactive vinyl polymers.

Preferred curable materials are generated from free radical curable precursor polymer subunits. These precursor polymer subunits are capable of polymerizing rapidly upon an exposure to thermal energy and/or radiation energy (e.g, photopolymerizable). One preferred subset of free radical curable precursor polymer subunits includes ethylenically unsaturated precursor polymer subunits. Examples of such ethylenically unsaturated precursor polymer subunits include aminoplast monomers or oligomers having pendant alpha, beta unsaturated carbonyl groups, ethylenically unsaturated monomers or oligomers, acrylated isocyanurate monomers, acrylated urethane oligomers, acrylated epoxy monomers or oligomers, ethylenically unsaturated monomers or diluents, acrylate dispersions, and mixtures thereof. The term "(meth)acrylate" includes both acrylates and methacrylates.

Ethylenically unsaturated precursor polymer subunits include both monomeric and polymeric compounds that contain atoms of carbon, hydrogen and oxygen, and optionally, nitrogen and the halogens. Oxygen or nitrogen atoms or both are generally present in the form of ether, ester, urethane, amide, and urea groups. The ethylenically unsaturated monomers may be monofunctional, difuictional, trifunctional, tetrafunctional or even higher functionality, and include (meth)acrylate-based monomers. Suitable ethylenically unsaturated compounds are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, or maleic acid.

Representative examples of ethylenically unsaturated monomers include methyl (meth)acrylate, ethyl (meth)acrylate, styrene, divinylbenzene, hydroxyethyl (meth)acrylate, hydroxypropyl (meth)acrylate, hydroxybutyl (meth)acrylate, 2-hydroxy-3-phenoxy propyl (meth)acrylate, lauryl (meth)acrylate, octyl (meth)acrylate, caprolactone (meth)acrylate, tetrahydrofurfuryl (meth)acrylate, cyclohexyl (meth)acrylate, stearyl (meth)acrylate, 2-phenoxyethyl (meth)acrylate, isooctyl (meth)acrylate, isobomyl (meth)acrylate, isodecyl (meth)acrylate, polyethylene glycol mono (meth)acrylate, polypropylene glycol mono(meth)acrylate, vinyl toluene, ethylene glycol di(meth)acrylate, polyethylene glycol di(meth)acrylate, ethylene glycol di(meth)(meth)acrylate, hexanediol di(meth)acrylate, triethylene glycol di(meth)acrylate, 2-(2-ethoxyethoxy) ethyl (meth)acrylate, propoxylated trimethylol propane tri(meth)acrylate, trimethylolpropane tri(meth)acrylate, glycerol tri(meth)acrylate, pentaerthyitol tri(meth)acrylate, and pentaerythritol tetra (meth)acrylate. Other ethylenically unsaturated materials include monoallyl, polyallyl, or polymethallyl esters and amides of carboxylic acids, such as diallyl phthalate, diallyl adipate, or N,N-diallyladipamide. Additional examples include homopolymers and copolymers of vinylcaprolactam, ethyloxazoline homopolymers, vinylpyrrolidone copolymers, acrylonitrile-styrene copolymers, acrylonitrile-butadiene-styrene copolymers, (meth)acrylates polymers containing (e.e. pendant) nitrogen-containing moieties, and mixtures thereof. Still other nitrogen containing ethylenically unsaturated monomers include tris(2-acryloxyethyl) isocyanurate, 1,3,5-tri(2-methyacryloxyethyl)-s-triazine, acrylamide, methylacrylamide, N-methyl-acrylamide, N,N-dimethylacrylamide, N-vinylpyrrolidone, or N-vinyl-piperidone.

Another preferred precursor polymer subunit is a blend of ethylenically unsaturated oligomer and monomers. For example the precursor polymer subunits may comprise a blend of an acrylate functional urethane, one or more monofunctional acrylate monomers, and oligomer formed from the reaction product of tetrabromobisphenol-A diglycidylether and acrylic acid. Another useful blend may contain oligomer formed from the reaction product of tetrabromobisphenol-A diglycidylether and acrylic acid, multifunctional acrylate, and reactive diluent. In general, high refractive index resins produce higher gain films. Acceptable ranges of the aforementioned blends should yield an uncured refractive index of greater than 1.55.

Bulk Oligomer

To attain a curable layer with suitable gain, it is preferred that the curable layer is comprised of the reaction product of only one of these precursor polymer subunits and in particular the reaction product of Tetrabromobisphenol A diglycidyl ether and acrylic acid. For example, a suitable precursor polymeric subunit may be obtained from UCB Corporation, Smyrna, Ga. under the trade designation RDX-51027. This material comprises a major portion of 2-propenoic acid, (1-methylethylidene)bis[(2,6-dibromo-4,1-phenylene)oxy (2-hydroxy-3,1-propanediyl)] ester.

The first monomer is preferably present in the polymerizable composition in an amount of at least about 15 wt. % (e.g. 20 wt. %, 30 wt. %, 35 wt. %, 40 wt. %, 45 wt. % and 50 wt. % and any amount in between). Typically, the amount of the first monomer does not exceed about 65 wt. %.

Crosslinking Agent

The curable material of the present disclosure also includes at least one and preferably only one crosslinking agent. Multi-functional monomers can be used as crosslinking agents to increase the Tg of the cured polymer layer that results from the polymerizing of the curable material. The glass transition temperature can be measured by methods known in the art, such as differential scanning calorimetry (DSC), modulated DSC, or dynamic mechanical analysis. Preferably, the polymeric composition is sufficiently crosslinked to provide a glass transition temperature that is greater than 45° C. The crosslinking agent comprises at least three (meth)acrylate functional groups. Since methacrylate groups tend to be less reactive than acrylate groups, it is preferred that the crosslinking agent comprises three or more acrylate groups. Suitable crosslinking agents include for example pentaerythritol tri(meth)acrylate, pentaerythritol tetra(meth)acrylate, trimethylolpropane tri(methacrylate), dipentaerythritol penta(meth)acrylate, dipentaerythritol hexa(meth)acrylate, trimethylolpropane ethoxylate tri(meth)acrylate, glyceryl tri(meth)acrylate, pentaerythritol propoxylate tri(meth)acrylate, and ditrimethylolpropane tetra(meth)acrylate. Any one or combination of crosslinking agents may be employed.

The crosslinking agent is preferably present in the polymerizable composition in an amount of at least about 2 wt-%. Typically, the amount of crosslinking agent is not greater than about 50 wt-%. The crosslinking agent may be present in any amount ranging from about 5 wt-% and about 25 wt-%.

Preferred crosslinking agents include pentaerythritol tri(meth)acrylate, pentaerythritol tetra(meth)acrylate, dipentaerythritol penta(meth)acrylate, trimethylolpropane tri(meth)acrylate, ditrimethylolpropane tetra(meth)acrylate, and mixtures thereof. More preferably the crosslinking agent(s) is free of methacrylate functionality. Pentaerythritol triacrylate (PETA) and dipentaerythritol pentaacrylate are commercially available from Sartomer Company, Exton, Pa. under the trade designations SR444 and SR399LV respectively; from Osaka Organic Chemical Industry, Ltd. Osaka, Japan under the trade designation Viscoat #300; from Toagosei Co. Ltd., Tokyo, Japan under the trade designation Aronix M-305; and from Eternal Chemical Co., Ltd., Kaohsiung, Taiwan under the trade designation Etermer 235. Trimethylol propane triacrylate (TMPTA) and ditrimethylol propane tetraacrylate (di-TMPTA) are commercially available from Sartomer Company under the trade designations SR351 and SR355. TMPTA is also available from Toagosei Co. Ltd. under the trade designation Aronix M-309. Further, ethoxylated trimethylolpropane triacrylate and ethoxylated pentaerythritol triacrylate are commercially available from Sartomer under the trade designations SR454 and SR494 respectively.

Reactive Diluents

The curable material optionally, yet preferably comprises up to about 35 wt-% (e.g. integers ranging from 1 to 35) reactive diluents to reduce the viscosity of the curable material and to improve the processability. Reactive diluents are mono- or di-functional (meth)acrylate-fimctional monomers typically having a refractive index greater than 1.50. Such reactive diluents are typically non-halogenated (e.g. non-brominated). Suitable reactive diluents include for example phenoxyethyl (meth)acrylate, phenoxy-2-methylethyl (meth)acrylate, phenoxyethoxyethyl (meth)acrylate, 3-hydroxy-2-hydroxypropyl (meth)acrylate, benzyl (meth)acrylate, 4-(1-methyl-1-phenethyl) phenoxyethyl (meth)acrylate and phenylthioethyl (meth)acrylate.

The inclusion of only one diluent is preferred for ease in manufacturing. A preferred diluent is phenoxyethyl (meth)acrylate, and in particular phenoxyethyl acrylate (PEA). Phenoxyethyl acrylate is commercially available from more than one source including from Sartomer under the trade designation SR339; from Eternal Chemical Co. Ltd. under the trade designation Etermer 210; and from Toagosei Co. Ltd under the trade designation TO-1166. Benzyl acrylate is commercially available from AlfaAeser Corp, Ward Hill, Mass. It may also be beneficial to optionally include halogenated monomers or urethane acrylate monomers.

Initiators

Curable materials comprising precursor polymer subunits containing ethylenically unsaturated monomers and oligomers, may additionally comprise polymerization initiators. Examples include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, or mixtures thereof. Examples of suitable commercially available, ultraviolet-activated and visible light-activated photoinitiators have tradenames such as IRGACURE 651™, IRGACURE 184™, IRGACURE 369™, IRGACURE 819™, DAROCUR 4265™ and DAROCUR 1173™ commercially available from Ciba Specialty Chemicals, Tarrytown, N.Y. and LUCIRIN TPO™ and LUCIRIN TPO-L™ commercially available from BASF (Charlotte, N.C.). Examples of suitable visible light-activated initiators are reported in U.S. Pat. No. 4,735,632 (Oxman et al.) and U.S. Pat. No. 5,674,122 (Kiun et al.).

A suitable initiator system may include a photosensitizer. Representative photosensitizers may have carbonyl groups or tertiary amino groups or mixtures thereof. Preferred photosensitizers having carbonyl groups are benzophenone, acetophenone, benzil, benzaldehyde, o-chlorobenzaldehyde, xanthone, thioxanthone, 9,10-anthraquinone, or other aromatic ketones. Preferred photosensitizers having tertiary amines are methyldiethanolamine, ethyldiethanolamine, triethanolamine, phenylmethyl-ethanolamine, or dimethylaminoethylbenzoate. Commercially available photosensitizers include QUANTICURE ITX™, QUANTICURE QTX™, QUANTICURE PTX™, QUANTICURE EPD™ from Biddle Sawyer Corp.

In general, the amount of photosensitizer or photoinitiator system may vary from about 0.01 to 10% by weight.

Cationic initiators may be used to initiate polymerization when the curable material is based upon an epoxy or vinyl ether. Examples of cationic initiators include salts of onium cations, such as arylsulfonium salts, as well as organometallic salts such as ion arene systems. Other examples are reported in U.S. Pat. No. 4,751,138 (Tumey et al.); U.S. Pat. No. 5,256,170 (Harmer et al.); U.S. Pat. No. 4,985,340 (Palazotto); and U.S. Pat. No. 4,950,696, all incorporated herein by reference.

Dual-cure and hybrid-cure photoinitiator systems may also be used. In dual-cure photoiniator systems, curing or polymerization occurs in two separate stages, via either the same or different reaction mechanisms. In hybrid-cure photoinitiator systems, two curing mechanisms occur at the same time upon exposure to ultraviolet/visible or electron-beam radiation.

Additional Components

Various additional compounds can be added to the composition of the curable layers, including the co-monomers described below for use in optical film. Additional components may include wetting agents, photoinitiators, thermal initiators, catalysts, activators, cross-linking agents, can be added for improved processing, layer formation and adhesion to other layers. Other additives to the curable layer may include photostabilizers, antioxidants, UV-absorbers, UV-stabilizers, near-infrared absorbers, plasticizers, surfactants, dyes, colorants, and pigments.

Curable Layers as Surface Coating Layers

A curable layer can serve as an as a surface (e.g., coating) layer. The curable layer may function as a hardcoat, antiglare coating, matte surface, diffuse layer, anti-film coupling layer to prevent the coupling or wetting out of other adjacent films, microstructured optical layer, adhesive layer, or combinations thereof. Other curable layers include, for example, abrasion resistant or hardcoat materials; optical coatings; etc. Additional functional layers or coatings are described, for example, in U.S. Pat. No. 6,352,761 and WO 97/01440, WO 99/36262, and WO 99/36248, which are incorporated herein by reference. These functional components may be incorporated into one or more curable layers, or they may be applied as a curable layer in a separate film or coating.

Surface Texture or Structures

The curable layer may also have a surface texture, such as a matte surface, or it may include surface structures. Surface structures can include a variety of prismatic microstructures, such as those found on brightness enhancing films, 3M Company. The precursor polymer units described above can be used in curable materials to form a curable layer having surface texture or microstructure. In an embodiment, the curable material coated onto the norbornene-based cyclic olefin layer is a photo-curable material.

In an embodiment, the curable layer is a layer having surface structures, such as linear prismatic structures similar to those of brightness enhancing films. Curable material for the surface-structured layer, can contain a high index of refraction oligomer, multifunctional crosslinker, and a reactive diluent. In one embodiment, the curable material comprises ethylenically unsaturated monomers, ethylenically unsaturated oligomers, or blends thereof, wherein the uncured material has an index of refraction greater than 1.55. In one embodiment, curable material for the surface-structured layer, can contain a high index of refraction oligomer, urethane acrylate, reactive diluent, and a high refractive index monomer.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer in the visible light region (available commercially, for example, from Fisher Instruments of Pittsburgh, Pa.). It is generally appreciated that the measured index of refraction can vary to some extent depending on the instrument.

In another embodiment, the curable material additionally comprises the reaction product of Tetrabromobisphenol A glycidyl ether an (meth)acrylic acid. In a further embodiment, the ethylenically unsaturated monomers are multifunctional acrylates. Preferably the material is substantially free of methacrylate functionality. The multifunctional acrylate can be trimethylolpropane triacrylate. In a stiff further embodiment, the curable material additionally comprises 2-phenoxyethyl acrylate or tribromophenoxy ethyl acrylate.

Mixtures of the precursor polymer subunits described supra may be employed in the curable material, but for ease in manufacturing it is preferred to employ as few different monomers as possible. To attain a curable layer with suitable gain, it is preferred that the curable layer is comprised of the reaction product of only one of these precursor polymer subunits and in particular the reaction product of Tetrabromobisphenol A diglycidyl ether and acrylic acid. For example, a suitable precursor polymeric subunit may be obtained from UCB Corporation, Smyrna, Ga. under the trade designation RDX-51027. This material comprises a major portion of 2-propenoic acid, (1-methylethylidene)bis [(2,6-dibromo-4,1-phenylene)oxy(2-hydroxy-3,1-propanediyl)] ester.

Curable Adhesive Materials

In some embodiments, the curable layer is an adhesive layer. In these embodiments, the curable material is a curable adhesive. The precursor polymer subunits described above can be used as curable adhesives. In an additional embodiment, the curable adhesive comprises two or more ethylenically unsaturated monomers, wherein at least one monomer is nitrogen-containing. In a further embodiment, the curable adhesive comprises a nitrogen-containing ethylenically unsaturated (meth)acrylate and an ethylenically unsaturated (meth)acrylate. In a yet further embodiment, the curable adhesive comprises a nitrogen-containing ethylenically unsaturated acrylate monomer and a nitrogen-free ethylenically unsaturated acrylate monomer. For example the precursor polymer subunits may comprise a blend of an acrylate functional urethane oligomer and one or more monofunctional acrylate monomers. This acrylate monomer may be a pentafunctional acrylate, tetrafunctional acrylate, trifimctional acrylate, difunctional acrylate, monofunctional acrylate polymer, or combinations thereof.

In particular, the curable layers can serve as adhesive layers to bind an optical film to the norbornene-based cyclic olefin layer. Where the curable layer serves as an adhesive layer, the curable material is referred to as a radiation energy curable adhesive. In some embodiments, the curable layers comprise a photo curable material with adhesive properties.

A norbornene-based cyclic olefin layer or film can be coated with one or more of the curable layers described above.

Optical Films

Various optical films are suitable for use with the present disclosure. In particular, polymeric optical films, including oriented polymeric optical films, are suitable for use with the present disclosure because they may sometimes suffer from dimensional instability from exposure to temperature fluctuations.

In particular, the norbornene-based cyclic olefins layers are suited for use with polymeric films that would benefit from dimensional stabilization. For example, some polymeric optical films can show dimensional instability upon exposure to temperature or humidity variation. The optical films are typically thin. Suitable films include films of varying thickness, but particularly films less than 15 mils (about 380 micrometers) thick, more typically less than 10 mils (about 250 micrometers) thick, and preferably less than 7 mils (about 180 micrometers) thick.

The optical films include polymeric multilayer optical films, including multilayer films (whether composed of all birefringent optical layers, some birefringent optical layers, or all isotropic optical layers) having a high reflectivity over a wide bandwidth, and continuous/disperse phase optical films. The optical films include polarizers and mirrors. In general, multilayer optical films are specular reflectors and continuous/disperse phase optical films are diffuse reflectors, although these characterizations are not universal (see, e.g., the diffuse multilayer reflective polarizers described in U.S. Pat. No. 5,867,316). These optical films are merely illustrative and are not meant to be an exhaustive list of suitable polymeric optical films useful with the present disclosure.

Both multilayer reflective optical films and continuous/disperse phase reflective optical films rely on index of refraction differences between at least two different materials (preferably polymers) to selectively reflect light of at least one polarization orientation. Suitable diffuse reflective polarizers include the continuous/disperse phase optical films described in U.S. Pat. No. 5,825,543, incorporated herein by reference, as well as the diffusely reflecting optical films described in U.S. Pat. No. 5,867,316, incorporated herein by reference.

Optical films that are especially suitable for use in the present disclosure are multilayer reflective films such as those described in, for example, U.S. Pat. No. 5,882,774 and U.S. Pat. No. 6,352,761 and in PCT Publication Nos. WO95/17303; WO95/17691; WO95/17692; WO95/17699; WO96/19347; and WO99/36262, all of which are incorporated herein by reference. The film is preferably a multilayer stack of polymer layers with a Brewster angle (the angle at which reflectance of p polarized light goes to zero) that is very large or nonexistent. The film is made into a multilayer mirror or polarizer whose reflectivity for p polarized light decreases slowly with angle of incidence, is independent of angle of incidence, or increases with angle of incidence away from the normal. Commercially available forms of such multilayer reflective polarizers are marketed as Dual Brightness Enhanced Film (DBEF) by 3M, St. Paul, Minn. Multilayer reflective optical films are used herein as an example to illustrate optical film structures and methods of making and using the optical films of the present disclosure. The structures, methods, and techniques described herein can be adapted and applied to other types of suitable optical films. Additional description of suitable optical films is provided below.

A suitable multilayer reflective optical film can be made by alternating (e.g., interleaving) uniaxially- or biaxially-oriented birefringent first optical layers with second optical layers. In some embodiments, the second optical layers have an isotropic index of refraction that is approximately equal to one of the in-plane indices of the oriented layer. The interface between the two different optical layers forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers. Generally, multilayer optical films have about 2 to 5000 optical layers, typically about 25 to 2000 optical layers, and often about 50 to 1500 optical layers or about 75 to 1000 optical layers. A film having a plurality of layers can include layers with different optical thicknesses to increase the reflectivity of the film over a range of wavelengths. For example, a film can include pairs of layers which are individually tuned (for normally incident light, for example) to achieve optimal reflection of light having particular wavelengths. It should further be appreciated that, although only a single multilayer stack may be described; the multilayer optical film can be made from multiple stacks that are subsequently combined to form the film. The described multilayer optical films can be made according to U.S. Ser. No. 09/229724 and U.S. Patent Application Publication No. 2001/0013668, which are both incorporated herein by reference.

A polarizer can be made by combining a uniaxially-oriented first optical layer with a second optical layer having an isotropic index of refraction that is approximately equal to one of the in-plane indices of the oriented layer. Alternatively, both optical layers are formed from birefringent polymers and are oriented in a multiple draw process so that the indices of refraction in a single in-plane direction are approximately equal. The interface between the two optical layers forms a light reflection plane for one polarization of light. Light polarized in a plane parallel to the direction in which the indices of refraction of the two layers are approximately equal will be substantially transmitted. Light polarized in a plane parallel to the direction in which the two layers have different indices will be at least partially reflected. For polarizers having second optical layers with isotropic indices of refraction or low in-plane birefringence (e.g., no more than about 0.07), the in-plane indices ($n_x$ and $n_y$) of refraction of the second optical layers are approximately equal to one in-plane index (e.g., $n_y$) of the first optical layers. Thus, the in-plane birefringence of the first optical layers is an indicator of the reflectivity of the multilayer optical film. Typically, it is found that the higher the in-plane birefringence, the better the reflectivity of the multilayer optical film. If the out-of-plane indices ($n_z$) of refraction of the first and second optical layers are equal or nearly equal (e.g., no more than 0.1 difference and preferably no more than 0.05 difference), the multilayer optical film also has better off-angle reflectivity. A mirror can be made using at least one uniaxially birefringent material, in which two indices (typically along the x and y axes, or $n_x$ and $n_y$) are approximately equal, and different from the third index (typically along the z axis, or $n_z$). The x and y axes are defined as the in-plane axes, in that they represent the plane of a given layer within the multilayer film, and the respective indices $n_x$ and $n_y$ are referred to as the in-plane indices. One method of creating a uniaxially birefringent system is to biaxially orient (stretch along two axes) the multilayer polymeric film. If the adjoining layers have different stress-induced birefringence, biaxial orientation of the multilayer film results in differences between refractive indices of adjoining layers for planes parallel to both axes, resulting in the reflection of light of both planes of polarization. A uniaxially birefringent material can have either positive or negative uniaxial birefringence. Positive uniaxial birefringence occurs when the index of refraction in the z direction ($n_z$) is greater than the in-plane indices ($n_x$ and $n_y$). Negative uniaxial birefringence occurs when the index of refraction in the z direction $n_z$) is less than the in-plane indices (nx and ny). If $n_{1z}$ is selected to match $n_{2x}=n_{2y}=n_{2z}$ and the multilayer film is biaxially oriented, there is no Brewster's angle for p-polarized light and thus there is constant reflectivity for all angles of incidence. Multilayer films that are oriented in two mutually perpendicular in-plane axes are capable of reflecting an extraordinarily high percentage of incident light depending of the number of layers, f-ratio, indices of refraction, etc., and are highly efficient mirrors. Mirrors can also be made using a combination of uniaxially-oriented layers with in-plane indices of refraction which differ significantly.

The first optical layers are preferably birefringent polymer layers that are uniaxially- or biaxially-oriented. The birefringent polymers of the first optical layers are typically selected to be capable of developing a large birefringence when stretched. Depending on the application, the birefringence may be developed between two orthogonal directions in the plane of the film, between one or more in-plane directions and the direction perpendicular to the film plane, or a combination of these. The first polymer should maintain birefringence after stretching, so that the desired optical properties are imparted to the finished film. The second optical layers can be polymer layers that are birefringent and uniaxially- or biaxially-oriented or the second optical layers can have an isotropic index of refraction which is different from at least one of the indices of refraction of the first optical layers after orientation. The second polymer advantageously develops little or no birefringence when stretched, or develops birefringence of the opposite sense (positive-negative or negative-positive), such that its film-plane refractive indices differ as much as possible from those of the first polymer in the finished film. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymers to absorb specific wavelengths, either totally or in part.

The first and second optical layers and the optional non-optical layers of the multilayer optical film are composed of polymers such as, for example, polyesters. Polyesters for use in the multilayer optical films of the present disclosure generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbomene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1-C10 straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbomanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis (2-hydroxyethoxy)benzene.

One polyester useful in the optical films of the present disclosure is polyethylene naphthalate (PEN), which can be made, for example, by reaction of naphthalene dicarboxylic acid with ethylene glycol. Polyethylene 2,6-naphthalate (PEN) is frequently chosen as a first polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Other semicrystalline polyesters suitable as first polymers include, for example, polybutylene 2,6-naphthalate (PBN), polyethylene terephthalate (PET), and copolymers thereof.

Additional materials useful as first polymers are described, for example, in U.S. Pat. Nos. 6,352,762 and 6,498,683 and U.S. patent applications Ser. Nos. 09/229724, 09/232332, 09/399531, and 09/444756, which are incorporated herein by reference. One polyester that is useful as a first polymer is a coPEN having carboxylate subunits derived from 90 mol % dimethyl naphthalene dicarboxylate and 10 mol % dimethyl terephthalate and glycol subunits derived from 100 mol % ethylene glycol subunits and an intrinsic viscosity (IV) of 0.48 dL/g. The index of refraction is approximately 1.63. The polymer is herein referred to as low melt PEN (90/10). Another useful first polymer is a PET having an intrinsic viscosity of 0.74 dL/g, available from Eastman Chemical Company (Kingsport, Tenn.). Non-polyester polymers are also useful in creating polarizer films. For example, polyether imides can be used with polyesters, such as PEN and coPEN, to generate a multilayer reflective mirror. Other polyester/non-polyester combinations, such as polyethylene terephthalate and polyethylene (e.g., those available under the trade designation Engage 8200 from Dow Chemical Corp., Midland, Mich.), can be used.

The second polymer should be chosen so that in the finished film, the refractive index, in at least one direction, differs significantly from the index of refraction of the first polymer in the same direction. Because polymeric materials are typically dispersive, that is, the refractive indices vary with wavelength, these conditions should be considered in terms of a particular spectral bandwidth of interest. It will be understood from the foregoing discussion that the choice of a second polymer is dependent not only on the intended application of the multilayer optical film in question, but also on the choice made for the first polymer, as well as processing conditions.

The second optical layers can be made from a variety of second polymers having glass transition temperatures compatible with that of the first polymer and having a refractive index similar to the isotropic refractive index of the first polymer. Examples of suitable polymers, other than the CoPEN polymers discussed above, include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates.

Exemplary second polymers include homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional second polymers include copolymers of PMMA (coPMMA), such as a coPMMA made from 75 wt % methylmethacrylate (MA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units, or a blend of PMMA and poly(vinylidene fluoride) (PVDF) such as that available from Solvay Polymers, Inc., Houston, Tex. under the trade designation Solef 1008.

Yet other second polymers include polyolefin copolymers such as poly (ethylene-co-octene) (PE-PO) available from Dow-Dupont Elastomers under the trade designation Engage 8200, poly (propylene-co-ethylene) (PPPE) available from Fina Oil and Chemical Co., Dallas, Tex., under the trade designation Z9470, and a copolymer of atatctic polypropylene (aPP) and isotatctic polypropylene (iPP) available from Huntsman Chemical Corp., Salt Lake City, Utah, under the trade designation Rexflex W111. Second optical layers can also be made from a functionalized polyolefin, such as linear low density polyethylene-g-maleic anhydride (LLDPE-g-MA) such as that available from E. I. DuPont de Nemours & Co., Inc., Wilmington, Del., under the trade designation Bynel 4105.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of mirrors include PET/PMMA or PET/coPMMA, PEN/PMMA or PEN/coPMMA, PET/ECDEL, PEN/ECDEL, PEN/sPS, PEN/THV, PEN/co-PET, and PET/sPS, where "co-PET" refers to a copolymer or blend based upon terephthalic acid (as described above), ECDEL is a thermoplastic polyester commercially available from Eastman Chemical Co., and THV is a fluoropolymer commercially available from 3M Co. PMMA refers to polymethyl methacrylate and PETG refers to a copolymer of PET employing a second glycol (usually cyclohexanedimethanol). sPS refers to syndiotactic polystyrene.

In some embodiments, one or both of outer surfaces (major surface) of the optical film are preferably a polyester co-polymer, such as Co-PEN described supra.

METHOD A

Additional Surface Layers Coated on Norbornene-based Cyclic Olefins

One aspect of the present disclosure is a method for forming a curable layer on a norbomene-based cyclic olefin film or on a norbomene-based cyclic olefin layer of a multilayer film. This method does not require the curable layer and the norbomene-based cyclic olefin layer or film to be co-extruded. Using this method, one or more curable layers can be coated onto a major surface of a norbomene-based cyclic olefin film/layer. The curable layer or layers for coating onto the norbomene-based cyclic olefin layer preferably comprise one or more curable materials. Suitable curable materials, curing methods and additional components of the curable materials are described above.

Adhesion of the curable layer to the norbomene-based cyclic olefin film is improved by corona treatment of the norbornene-based cyclic olefin film surface in-line with coating the curable layer. Corona treatment refers to dielectric barrier discharges directed on a polymer surface. Corona treatment as used herein refer generally to any process in which active gas-phase species (such as free radicals, ions, or electronically or vibrationally excited states) are produced by electron impact with neutral gas molecules. Corona treatment as used herein is also known by many other terms. These terms include, but are not limited to: dielectric-barrier discharges, corona, corona discharge, barrier discharge, atmospheric-pressure plasma, atmospheric-pressure glow discharge, atmospheric-pressure, non-equilibrium plasma, silent discharge, atmospheric-pressure partially ionized gas, filamentary discharge, direct or remote atmospheric-pressure discharge, externally sustained or self-sustained atmospheric discharge, and the like. Air coronas (air dielectric-barrier discharges) are sustained in an atmosphere consisting substantially of air. Reduced pressure (vacuum) plasmas or glow discharges may also be used; however, air coronas under standard pressure are preferred.

Other similar treatments that may be used in lieu of corona treatment, for example flame treatment. Flames as used herein include both premixed and diffusion flames and both laminar and turbulent flames. Flame treatments are described in U.S. Pat. Nos. 5,753,754; 5,891,967; 5,900,317; and 6,780,519, under assignment to 3M Co. and herein incorporated by reference. Another alterative is ozone treatments, ozonation, or the combined exposure of ozone and UV light, particularly at wavelengths from 200-300 nm.

Curable layers can be located between one or more norbornene-based cyclic olefin layers and an optical film. Alternatively or additionally, curable layers can be located on one or more norbornene-based cyclic olefin layers, wherein the curable layer is not adjacent the optical film. In one embodiment, a curable layer is applied to a norbornene-based film. This "prepared" norbornene-based film may be later applied to an optical film.

A curable layer is normally transparent or substantially transparent so as to avoid reducing the optical properties of the film or optical body. The thickness of a curable layer will depend on its use. A curable adhesive layer is typically less than 2 mils (about 50 micrometers) thick, more typically about 1 mil (about 25 micrometers) thick, but not less than about 0.5 mil (about 12 micrometers) thick. In some embodiments, a curable layer as a surface layer, such as in FIGS. 1 and 4-6, is typically less than 2 mils thick; typically less than about 1.5 mils thick, and most typically less than 1 mil thick. In other embodiments, the curable layer is most typically about 1 mil thick. In other embodiments, the curable layer can be less than about 0.5 mils thick.

The thickness of the curable layer is preferably minimized in order to maintain a thin optical body. Nonetheless, thicker curable layers can be produced if desirable for a particular application.

For further description regarding association of a curable layer to the norbomene-based cyclic olefin layer, see Example I below.

Method B

Various methods may be used for forming the composite optical body of the present disclosure. As stated above, the optical bodies can take on various configurations, and thus the methods vary depending upon the configuration of the final optical body. One method is to apply the norbomene-based cyclic olefin polymers to other optical bodies in a molten state. This step can be conducted by co-extrusion coating the norbornene-based cyclic olefin layers with an adhesive layer onto the optical film.

Extrudable adhesive layers (e.g., tie layers) may be integrally formed with the norbornene-based cyclic olefin layer, the optical layers, or both. An adhesive layer can be integrally formed with the norbornene-based cyclic olefin layer or optical layers by being simultaneously co-extruded or sequentially extruded onto the optical film. Adhesive layers are located between one or more norbornene-based cyclic olefin layers and the optical film. See FIGS. 2-6 for example multilayer structures, wherein the norbornene-based cyclic olefin layers 14 and adhesive layers 16 can be formed by this method.

Extrudable adhesive layers are normally transparent or substantially transparent so as to avoid reducing the optical properties of the film. The intermediate adhesive layer is typically between 2 mils (about 50 micrometers) and 0.5 mils (about 12 micrometers) thick. More typically the adhesive layer is between 2 mils and 1 mil. The thickness of the adhesive layer is preferably minimized in order to maintain a thin optical body.

The composition of the adhesive layer is typically chosen in order to be compatible with the optical film and/or the norbornene-based cyclic olefin layer that they contact. The adhesive layers should bind well to both the optical film and the norbornene-based cyclic olefin layer. Therefore, the choice of the material used in the adhesive layer will often vary depending upon the composition of the other components of the optical body. The adhesive layer or layers are preferably thermally stable in a melt phase at temperatures above 250° C. for co-extrusion with the norbornene-based cyclic olefin copolymer. Thus, the adhesive layer does not substantially degrade during extrusion at temperatures greater than 250° C.

In specific implementations, the adhesive layer is an extrudable transparent hot melt adhesive. Materials useful for adhesive layers include polyolefins modified with vinyl acetate such as Elvax™ polymers from Dupont and polyolefins modified with maleic anhydride such as Bynel™ polymers from Dupont and ethylene-based polymers modified with maleic anhydride such as Admer™ polymers from Mitsui Chemicals and ethylene/methyl acrylate/glycidyl methacrylate terpolymers such as Lotader™ polymers from Atofina Chemicals, now Total Petrochemicals, Inc. Other adhesive layers include copolymers and terpolymers of ethylene with a variety of comonomers. Possible comonomers may include acrylate compounds including methyl acrylate, ethyl acrylate and butyl acrylate, vinyl acetate, maleic anhydride, glycidyl methacrylate, vinyl acetate, maleic anhydride, glycidyl methacrylate, vinyl alcohol, and acrylic acid compounds including methacrylic acid. These copolymers and terpolymers may also include reactive groups grafted onto the polymer backbone of the copolymer or terpolymer. Grafted reactive groups may include maleic anhydride. Other materials for adhesive layers include polyethylenes or other polyolefins grafted with maleic anhydride.

Various additional compounds can be added, including the comonomers previously listed in the optical film. Extrusion aids such as plasticizers and lubricants can be added for improved processing and adhesion to other layers. Also, particles such as inorganic particles or polymer beads can be used.

Figure 7:
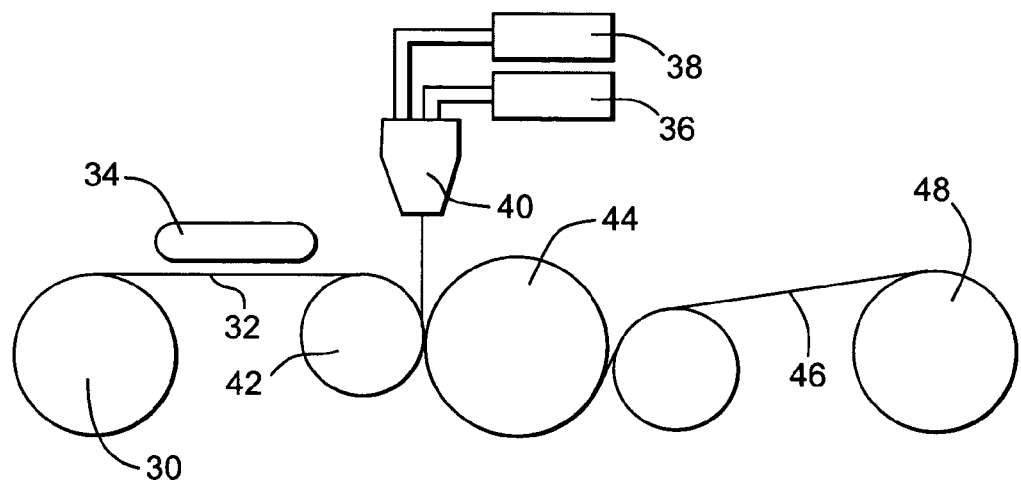
FIG. 7 is a plan view of a system for forming an optical body in accordance with an implementation of the present disclosure.

FIG. 7 shows a plan view of a system for forming a multilayer film, e.g., an optical body, in accordance with one implementation of the present disclosure. Spool 30 containing optical film 32 is unwound and is optionally heated at infrared heating station 34. Optical film 32 is sometimes raised to a temperature above 50° C., and more commonly to a temperature of approximately 65° C. Composition 36 for forming a norbornene-based cyclic olefin layer and composition 38 for forming an adhesive layer are fed through feed block 40 and coextrusion coated onto the preheated optical film 32. Thereafter, the optical film is pressed between rolls 42, 44. Roll 42 or roll 44 or both optionally contain a matte-finish to impart a slightly diffuse surface on the norbornene-based cyclic olefin layer. After cooling, the coated optical film 46 can be rolled onto winder 48, and can then be subsequently processed, such as by cutting into sheets, to form a finished multilayer film, e.g., optical body. Optionally, curable layers may be added to the multilayer film by methods described in Example II. In some embodiments where a flat multilayer film, e.g., optical body, is preferred, it is preferred to cool the multilayer film before winding onto a core. Additionally, the tension of the multilayer film during winding may be controlled, for example reduced, to reduce curl caused by winding onto a core.

In one embodiment of the present disclosure, the multilayer film is formed concurrently with a coextruded norbornene-based cyclic olefin film, in a manner similar to Method B. The multilayer film comprising at least one norbornene-based cyclic olefin layer can be oriented, for example, by stretching individual sheets of the optical body material in heated air. Optical films can be oriented as described for example in specific methods and materials are taught in PCT patent application WO 99/36812 entitled "An Optical Film and Process for Manufacture Thereof", incorporated herein by reference in its entirety.

Norbornene-based cyclic olefin films (i.e. not co-extruded applications) are preferably affixed on multilayer optical films post-tenter.

EXAMPLE I

Figure 8:
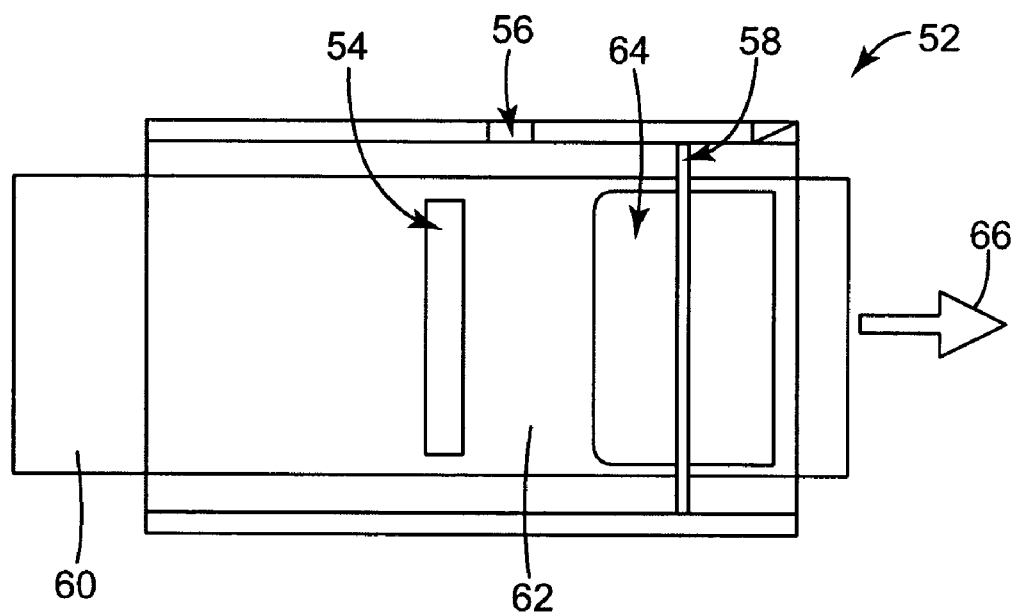
FIG. 8 is a schematic top view of a representative arrangement of an in-line corona electrode above the bed of a knife coater upstream of the "knife" edge.

UV-curable materials were adhered to norbornene-based cyclic olefin substrates. Norbornene-based cyclic olefin substrates include norbornene-based cyclic olefin films and norbornene-based cyclic olefin layers on the surface of optical bodies. The norbornene-based cyclic olefin substrates were treated with air corona immediately prior to coating with a curable material. To accomplish this in-line surface treatment, a corona treatment system 52, as shown in the representative arrangement of FIG. 8, was constructed by mounting a ceramic-tube corona electrode 54 above the bed of a knife coater 56 upstream of the coating knife 58. Untreated film 60 is continuously fed in the direction of arrow 66 through the corona treatment system 52. The untreated film 60 is corona treated at corona electrode 54. Corona-treated film 62 continues through coating area where curable material 64 is applied. Coating knife 58 levels the curable material 64, which is subsequently cured. In a preferred embodiment, the corona-treated film 62 coated curable material 64 continues through a curing station (not shown) adjacent the corona treatment system. This arrangement allows for the air-corona treatment of a film 60 immediately prior to the film contacting the material to be coated and cured.

Norbornene-based cyclic olefin films produced using a norbornene-based cyclic olefin blend having a composition of 75% Topas™ 6013 resin ($T_g$=140° C.)/25% Topas™ 8007 resin (Tg=80° C.) were made. Films comprised of 100% Topas™ 6013 were also made. The Topas™ resins are statistically random, completely amorphous copolymers of norbornene and ethylene. The higher $T_g$ grade contains a higher mole percentage of the norbornene monomer compared with the lower $T_g$ grade. The 75% Topas™ 6013 resin/25% Topas™ 8007 resin blend is compatible and miscible.

The powered corona electrode 54 had an active length (crossweb) of ca. 11 cm, and was located from approximately 4 to 12 cm upstream of the coating knife 58. The gap from the corona electrode 54 to the bed of the knife coater 56 was 1.5 mm (60 mils). A corona power of 200 W was used.

The coated material was exposed to a UV cure source shortly after coating. The coated curable material was UV-cured under a nitrogen atmosphere at 50 feet per minute (web speed) using Fusion D bulbs (F-600) at 100% power.

One of the curable materials used will be referred to as "curable material A". The formulation of the curable material A was: 30.0%(w/w) brominated epoxy diacrylate, manufactured by UCB Radcure Inc, in Smyrna, Ga., under the designation RDX 51027, 20.0%(w/w) hexafunctional aromatic urethane acrylate oligomer also available from UCB Radcure Inc., under the designation EB 220, 37.5%(w/w) 2-(2,4,6-tribromophenyl)-1-ethanol acrylic ester, sold as BR-31 (CAS #7347-19-5) by Dai-Ichi Kogyo Seiyaka Co. of Japan, 12.5% 2-phenoxyethyl acrylate sold under the name Photomer 4035 by Henkel Corp., of Ambler Pa., 0.3 pph of a fluorosurfactant sold under the trade name FC-430 by 3M Company of St. Paul Minn., 1.0 pph of a photoinitiator under the trade designation Darocure 1173 from Ciba Geigy of Tarrytown, N.Y., and 1.0 pph of a photoinitiator under the trade designation Lucirin® TPO from BASF of Charlotte N.C.. The uncured curable material A formulation has an index of refraction of 1.56.

Another curable material used will be referred to as "curable material B". The formulation of curable material B is identical to that of curable material A with the exception that Lucirin® TPO is not added to the formulation. The uncured curable material B formulation has an index of refraction of 1.56.

A curable adhesive composition used will be referred to as "curable material C". The formulation of curable material C is believed to contain a polymerizable nitrogen containing acrylate monomer and nitrogen-free polymerizable acrylate monomers.

Curable materials A and C were coated at a thickness of approximately 1.5 mils. on films of Topas™ 6013. The coated material was exposed to the UV cure source shortly after coating. The coated material was UV-cured with the coating facing the UV cure source under a nitrogen atmosphere at 50 feet per minute web speed using Fusion D bulbs (F-600) at 100% power.

Adhesion was tested by ASTM D3359-02, Standard Test Methods for Measuring Adhesion by Tape Test, Method B. Adhesion was measured by scoring the cured coating with a crosshatch adhesion "car" holding sharp razor blades, placing 3M #610 tape (cellophane tape with high tack, rubber resin adhesive) over the scored area at 45 degrees relative to the cross-hatch pattern, rubbing the tape with a plastic blade, and then snapping off the tape from the surface. The scale used to evaluate test performance is presented in Table 2. A 5B rating corresponds to excellent adhesion. A 0B rating corresponds to no adhesion.

TABLE 2

5B  The edges of the cuts are completely smooth; none of the squares of the lattice is detached.
4B  Small flakes of the coating are detached at intersections; less than 5% of the area is affected.
3B  Small flakes of the coating are detached along edges and at intersections of cuts. The area affected is 5 to 15% of the lattice.
2B  The coating has flaked along the edges and on parts of the squares. The area affected is 15 to 35% of the lattice.
1B  The coating has flaked along the edges of cuts in large ribbons and whole squares have detached. The area affected is 35 to 65% of the lattice.
0B  Flaking and detachment worse than Grade 1.

Several example materials with at least one norbornene-based cyclic olefin film or layer and at least one curable layer were prepared by the general method described above. Materials and conditions are presented in Table 3 and following description. Adhesion of the UV-curable materials was tested using ASTM D3359-02, Standard Test Methods for Measuring Adhesion by Tape Test, Method B. Details regarding conditions for preparation of the multi-layer films, and adhesion test results are presented in Table 3.

TABLE 3

| Sample # | Film/material combination Topas ™ 6013 film with: | Corona energy (estimated) (J/cm$^2$) | Distance between corona discharge and coating knife (cm) | Time between corona discharge and coating (sec) | Time between coating and curing (sec) | ASTM D3359 Adhesion results |
|---|---|---|---|---|---|---|
| 1 | Curable material A | 2 | 4 | <1 | 13 | 5B |
| 2 | Curable material A | 2 | 4 | <1 | est 20-30 | 4B |
| 3 | Curable material A | 1.25 | 4 | <0.5 | est 20-30 | 4B |
| 4 | Curable material A | 2 | n/a* | 65 | est 20-30 | 1B |
| 5 | Curable material A | 2 | n/a* | 240 | est 20-30 | 0B |
| 6 | Curable material A | 2 | 4 | <1 | 120 | 1B |
| 7 | Curable material A | 2 | 4 | <1 | 240 | 2B |
| 8 | Curable material A | 2 | 12 | 1.5 | est 20-30 | 4B |
| 9 | Curable material C | 0 | n/a* | n/a | est 20-30 | 0B |

TABLE 3-continued

| Sample # | Film/material combination Topas™ 6013 film with: | Corona energy (estimated) (J/cm²) | Distance between corona discharge and coating knife (cm) | Time between corona discharge and coating (sec) | Time between coating and curing (sec) | ASTM D3359 Adhesion results |
|---|---|---|---|---|---|---|
| 10 | Curable material C | 2 | 4 | <1 | est 20-30 | 5B |
| 11 | Curable material C | 2 | n/a* | 72 | est 20-30 | 4B |

*Corona discharge provided by apparatus separate from coating bed. Film is moved from one apparatus to another.

The corona-treated portion of the norbornene-based cyclic olefin film was readily detected by adhesion testing, with the untreated areas showing no adhesion. The treated areas showed clear adhesion improvement across the entire 11 cm width of film that was treated. In contrast, the curable materials had no adhesion to untreated norbornene-based cyclic olefin film. In addition, when norbornene-based cyclic olefin films were corona treated and then aged for hours or days prior to coating, no adhesion of curable material was observed.

The cured curable material A layer successfully adhered to the norbornene-based cyclic olefin films when the elapsed time between corona treatment and coating of the curable material A was less than about 65 s. Preferably the elapsed time between corona treatment and coating was less than about 1 second. There was no adhesion of cured curable material A to untreated norbornene-based cyclic olefin films. There was also no adhesion of the curable material to corona-treated norbornene-based cyclic olefin films when the elapsed time between corona treatment and coating was over 4 minutes.

Adhesion of the curable adhesive of curable material C to the norbornene-based cyclic olefin film was also improved by in-line air corona treatment when the elapsed time between treatment and coating of the adhesive was less than about 70 seconds. There was no adhesion of the curable adhesive to untreated norbornene-based cyclic olefin film.

Additional examples were produced using the method described above. These "prototype" examples are presented below.

Optical Film Prototype a

Optical film prototype a comprises a norbornene-based cyclic olefin (75% Topas™ 6013 resin/25% Topas™ 8007 resin) film. Using the process described above with the corona electrode approximately 5 cm upstream of the coating knife 58 of the coater 56 and the norbornene-based cyclic olefin film was pulled through the system 52 at a high rate, for example approximately 20 feet per minute. A curable material B was applied at a thickness between 0.003-0.004 inches after in-line air-corona treatment. The curable material-coated norbornene-based cyclic olefin film was placed face down on a negative master that following cure would yield a cured layer with a linear prismatic structure with 90 degree prism facet angles with a peak-to-peak pitch spacing of 65 microns. The negative master is an example of a surface microstructuring tool. The film was laminated against the negative master, which was held at 130° F. on a hot plate, using a smooth metal rod as a roller and UV-cured at the conditions described above with the film facing the UV cure source. After curing, the corona-treated portions of the construction released cleanly from the tool, indicating strong adhesion of the microstructured cured layer to the treated norbornene-based cyclic olefin film. For curable material coated on untreated areas of the norbornene-based cyclic olefin film, the curable material adhered to the tool rather than the norbornene-based cyclic olefin film.

Optical Film Prototype b

Using a similar technique, a microstructured cured layer was coated onto an optical film with a structure as shown in FIG. 3, to form an optical body with a structure as shown in FIG. 5. The finished optical body was designated Optical film prototype b.

The initial optical film with the structure shown in FIG. 3 was formed by coextrusion coating 5 mil skin layers of Topas™ 6013 on each side of a multilayer polymeric reflective polarizer film. The extrudable adhesive layers were 1.5-mil-thick layers of Admer™ SE810 (Mitsui Chemicals, Japan). The input multilayer polymeric reflective polarizer film will be referred to as "reflective polarizer film A". Reflective polarizer film A was constructed with first optical layers comprising PEN (polyethylene naphthalate) and second optical layers comprising coPEN (copolyethylene naphthalate). The PEN and coPEN were coextruded through a multi-layer melt manifold and multiplier to form 825 alternating first and second optical layers. This multi-layer optical film also contained an additional two internal layers and two external skin layers comprised of the same coPEN as the second optical layers for a total of 829 layers. The total film thickness of reflective polarizer A was 3.7 mil.

The microstructured cured layer was coated such that linear prismatic microstructure was aligned with the polarization pass axis of reflective polarizer A. Curable material A was used for this optical film construction.

Optical Film Prototype c

Optical film prototype c is structurally similar to the representation in FIG. 3. In optical film prototype c, an optical film is laminated between two norbornene-based cyclic olefin films, specifically Topas™ 6013. The two pieces of the norbornene-based cyclic olefin films had very little haze and were first individually corona treated. A piece of reflective polarizer A was then inserted between two pieces of the corona treated norbornene-based cyclic olefin film. A curable adhesive composition, resin C was then placed between the layers of film (i.e. between a major surface of each piece of norbornene-based cyclic olefin film and the major surfaces of the optical film). The five-layer "sandwich" was passed through a gap coater/laminator to uniformly apply the adhesive between the layers of film. The time between the corona treatment of the norbornene-based cyclic olefin film and coating (pulling the film sandwich through the gap coater) was 78 seconds. The target thickness of laminating adhesive was 1.5 mils per side for the laminate samples. The five-layer "sandwich" was subsequently cured in two pass process. The time between coating and curing was 27 seconds for the first pass. To insure complete curing of the curable adhesive, the five-layer "sandwich" was cured a second time through the opposite side of the sandwich.

Gain Measurement

The brightness gain (i.e. "gain") of a particular optical film is the ratio of the transmitted light intensity with the optical film placed above a given backlight or light cavity, such as an illuminated Teflon light cube, compared to without the optical film. In particular, the transmitted light intensity of an optical film is measured with a SpectraScan™ PR-650 SpectraColorimeter available from Photo Research, Inc, Chatsworth, Calif. An absorptive polarizer also is placed in front of the SpectraScan™ PR-650 SpectraColorimeter. The particular optical film is then placed on the Teflon light cube. The light cube is illuminated via a light-pipe using a Fostec DCR II light source. With this configuration, the gain is the ratio of the transmitted light intensity as measured with the optical film versus with it removed. For optical films that incorporate a reflective polarizer, the polarization pass axis of the reflective polarizer is aligned parallel to the polarization pass axis of the absorptive polarizer. For optical films similar in construction to Optical film prototype a, the linear prismatic microstructures are aligned parallel to the polarization pass axis of the absorptive polarizer.

The gain of the Optical film prototypes is shown in Table 4.

TABLE 4

| Sample | Gain |
| --- | --- |
| Optical prototype a | 1.438 |
| Optical prototype b | 2.005 |
| Optical prototype c | 1.703 |
| Reflective polarizer A | 1.691 |

The gain measurements indicate that the optical prototypes all provide gain. Given that the samples were not optimized, one would expect that upon being optimized the gain would improve particularly for Optical prototypes a and b. That the gain of Optical prototype c is close to the input reflective polarizer A indicates that laminated prototype changed little from the input reflective polarizer A.

EXAMPLE II

The method of Example II can be used to form films, optical bodies or portions of optical bodies that are suitable for use in the method of Example I.

A multi-layer reflective polarizer (e.g., an optical film) was constructed with first optical layers comprising PEN (polyethylene naphthalate) and second optical layers comprising coPEN (copolyethylene naphthalate). The PEN and coPEN were coextruded through a multi-layer melt manifold and multiplier to form 825 alternating first and second optical layers. This multi-layer optical film also contained an additiona two internal layers and two external protective boundary layers comprising the same coPEN as the second optical layers for a total of 829 layers with a thickness of 3.7 mil. This multilayer reflective polarizer film will be referred to as "reflective polarizer A". Similar reflective polarizers are available from 3M Company, under the tradename DBEF.

A norbornene-based cyclic olefin layer of Topas® 6013 was coextrusion coated with an adhesive layer, Admer® SE810 on each side of a multilayer optical film, e.g., reflective polarizer A to form an optical body. A representative structure is illustrated in FIG. 2. The coextruded layers and the optical film were nipped between a rubber roll and the patterned roll at the die exit. See FIG. 7 for a representative extrusion coating apparatus. A patterned roll was used to produce texture on the norbornene-based cyclic olefin layer of the optical body. The patterned roll had a roughness, R., of 90 microns and a gloss of 4.5%. The patterned roll, which has a 14-inch face width, was finished at UltraPlating in Wis. The patterned roll was heated to 210° F. The nip pressure was 90 psi.

A sample construction of multi-layer reflective polarizers that can be produced by the method above is shown schematically in FIG. 2. Optical body 22 in FIG. 3, and portions of the optical bodies presented in FIGS. 4-6, can also be produced by the method above. Various thicknesses of the norbornene-based cyclic olefin layer of Topas® 6013 cyclic-olefin copolymer and various adhesive layers were formed on the multilayer optical film, reflective polarizer A. The layer thicknesses for the sample constructions of multi-layer optical film with norbornene-based cyclic olefin layers are shown in Table 5. Coextruded adhesive polymers include: Admer® SE810 and Admer® SE 800 adhesive polymers, Mitsui Chemical; Lotader™, Orevac™, and Lotryl™ from Atofina; and Bynel™ and Fusabond™ from Dupont. The optical bodies presented in Table 5 exhibited good adhesion and were not readily peeled apart.

TABLE 5

| Norbornene-based layer thickness (mil - one side) | Adhesive layer material | Adhesive layer thickness (mil - one side) |
| --- | --- | --- |
| 5 | Admer ® SE800 | 2.0 |
| 10 | Admer ® SE800 | 1.5 |
| 14 | Admer ® SE810 | 1.0 |
| 6 | Admer ® SE810 | 0.7 |
| 5 | Bynel ® 1123 | 1.3 |
| 5 | Bynel ® 21E533 | 1.5 |
| 5 | Lotader ® AX8900 | 1.5 |

Sheets of various of multilayer optical films, e.g., optical bodies, containing norbornene based cyclic olefin layers of the present disclosure were placed in a variety of backlit LCD displays including computer notebooks, monitors and televisions. They demonstrated improved brightness. The LCD displays included an optical film containing at least one norbornene-based cyclic olefin layer, a light source, an LCD panel, and may additionally include a light guide and additional optical films.

The color for samples of multi-layer optical film with 6.0 mil norbornene-based cyclic olefin layers was evaluated using a SpectraScan™ PR 650 calorimeter from Photo research at 0° (on-axis) and 60° (off-axis) angles. The samples of multi-layer optical film with 6.0 mil norbornene-based cyclic olefin layers were aged at 85° C. in a dry environment for 1,000 hours. Samples and control films were also evaluated to determine on-axis gain. These samples were evaluated initially and at 250, 500, and 1,000 hours of exposure. No change in color was noted for an$_y$ of the samples. Gain remained essentially constant for all samples. UV aging testing of multi-layer optical film with 6.0 mil norbornene-based cyclic olefin layers was also performed. Visual examination of the test samples following UV aging shows that the multi-layer optical film with 6.0 mil norbornene-based cyclic olefin layers had not yellowed.

Sheets various of multilayer optical films containing norbornene based cyclic olefin layers were placed in a variety of backlit LCD displays including computer notebooks, monitors and televisions. They demonstrated improved brightness.

Although the present disclosure has been described with reference to preferred embodiments, those of skill in the art will recognize that changes may be made in form and detail without departing from the spirit and scope of the present disclosure.

The above specification, examples and data provide a complete description of the manufacture and use of the composition of the present disclosure. Since many embodiments of the present disclosure can be made without departing from the spirit and scope of the present disclosure, the invention resides in the claims hereinafter appended.

We claim:

1. A multilayer film comprising:
   a norbornene-based cyclic olefin film; and
   a layer attached to the norbornene-based cyclic olefin film, wherein the layer is formed from a curable material and wherein the layer has a structured surface.

2. The multilayer film of claim 1, wherein the curable material is a radiation energy-curable material.

3. The multilayer film of claim 1, wherein the curable material is a photopolymerizable material.

4. The multilayer film of claim 3, wherein the curable material is a UV curable material.

5. The multilayer film of claim 1, wherein the layer comprises an ethlyenically unsaturated monomer, ethlyenically unsaturated oligomer or blends thereof, wherein the index of refraction of the uncured curable material is greater than 1.55.

6. The multilayer film of claim 5, wherein the curable material comprises the reaction product of Tetrabromobisphenol A glycidyl ether and (meth)acrylic acid.

7. The multilayer film of claim 6, wherein the curable material further comprises a multi-functional acrylate.

8. The multilayer film of claim 7, wherein the multi-functional acrylate is trimethylolpropane triacrylate.

9. The multilayer film of claim 7, wherein the multi-functional acrylate is a urethane acrylate.

10. The multilayer film of claim 6, wherein the curable material further comprises 2-phenoxyethyl acrylate.

11. The multilayer film of claim 6, wherein the curable material further comprises tribromophenoxy ethyl acrylate.

12. The multilayer film of claim 1, wherein the norbornene-based cyclic olefin film consists substantially of a copolymer comprising norbornene or a derivative thereof, and ethylene.

13. The multilayer film of claim 1, wherein the norbornene-based cyclic olefin film is immediately adjacent to the curable layer.

14. The multilayer film of claim 1, wherein the structured surface comprises a plurality of linear prismatic structures.

15. An optical body comprising:
    an optical film;
    at least one norbornene-based cyclic olefin layer disposed on the optical film; and
    at least one layer formed from a curable material attached to the norbornene-based cyclic olefin layer.

16. The optical body of claim 15, wherein at least one layer formed from a curable material is attached to a major surface of at least one norbornene-based cyclic olefin layer, wherein the major surface is disposed generally opposite the optical film.

17. The optical body of claim 15, wherein at least one layer formed from a curable material is disposed between the optical film and at least one norbornene-based cyclic olefin layer.

18. The optical body of claim 17, wherein the curable material is an adhesive.

19. The optical body of claim 15, wherein the curable material is a photo-curable material.

20. The optical body of claim 15, wherein the optical film is a multilayer, polymeric optical film, continuous/disperse phase reflective optical film, diffuse multilayer reflective polarizer, or a multilayer reflective optical film.

21. The optical body of claim 15, wherein the norbornene-based cyclic olefin layer consists of a copolymer comprising norbornene or a derivative thereof, and ethylene.

22. The optical body of claim 15, wherein at least one layer formed from a curable material comprises a UV-curable material that functions as a UV stabilizer, abrasion resistant material, hardcoat material, anti-reflective coating, or a diffuser.

23. The optical body of claim 15, at least one layer formed from a curable material has a structured surface.

24. The optical body of claim 23, wherein the structured surface comprises a plurality of linear prismatic structures.

25. The optical body of claim 24, wherein the norbornene-based cyclic olefin layer is disposed immediately adjacent to the layer formed from a curable material having a structured surface.

26. An LCD device including an multilayer film according to claim 1 or an optical body of claim 15, a light source and an LCD panel.

* * * * *

UNITED STATES PATENT AND TRADEMARK OFFICE
CERTIFICATE OF CORRECTION

PATENT NO. : 7,329,465 B2
APPLICATION NO. : 10/976675
DATED : February 12, 2008
INVENTOR(S) : Bert T. Chien It is certified that error appears in the above-identified patent and that said Letters Patent is hereby corrected as shown below:

Title Page, Item (56) Other Publications,
Line 1, delete "Plymers" and insert -- Polymers --, therefor.

Item (57) Abstract,
Line 1, delete "norbomene" and insert -- norbornene --, therefor.
Line 3, delete "norbomene" and insert -- norbornene --, therefor.
Lines 7-8, delete "norbomene" and insert -- norbornene --, therefor.
Line 9, delete "norbomene" and insert -- norbornene --, therefor.

Page 2, under Item (56) U.S. Patent Documents,
Line 14, delete "Füfschilling et al." and insert -- Fünfschilling et al. --, therefor.

Page 2, Col. 2 U.S. Patent Documents,
Line 18, delete "Hino et al." and insert -- Kuroda et al. --, therefor.

Page 3, Col. 2, Other Publications,
Line 3, delete "Rerport" and insert -- Report --, therefor.

Column 1,
Line 31, delete "norbomene" and insert -- norbornene --, therefor.
Line 33, delete "norbomene" and insert -- norbornene --, therefor.
Lines 34-35, delete "norbomene" and insert -- norbornene --, therefor.
Line 38, delete "norbomene" and insert -- norbornene --, therefor.
Line 39, delete "norbomene" and insert -- norbornene --, therefor.
Lines 42-43, delete "norbomene" and insert -- norbornene --, therefor.
Line 45, delete "norbomene" and insert -- norbornene --, therefor.
Line 48, delete "norbomene" and insert -- norbornene --, therefor.
Lines 52-53, delete "norbomene" and insert -- norbornene --, therefor.
Line 56, delete "norbomene" and insert -- norbornene --, therefor.
Line 58, delete "norbomene" and insert -- norbornene --, therefor.
Line 59, delete "norbomene" and insert -- norbornene --, therefor.
Line 65, delete "norbomene" and insert -- norbornene --, therefor.
Line 66, delete "norbomene" and insert -- norbornene --, therefor.
Line 67, delete "norbomene" and insert -- norbornene --, therefor.

UNITED STATES PATENT AND TRADEMARK OFFICE
CERTIFICATE OF CORRECTION

PATENT NO. : 7,329,465 B2
APPLICATION NO. : 10/976675
DATED : February 12, 2008
INVENTOR(S) : Bert T. Chien It is certified that error appears in the above-identified patent and that said Letters Patent is hereby corrected as shown below:

Column 2,
Line 7, delete "norbomene" and insert -- norbornene --, therefor.
Line 12, delete "norbomene" and insert -- norbornene --, therefor.
Line 17, delete "norbomene" and insert -- norbornene --, therefor.
Line 22, delete "norbomene" and insert -- norbornene --, therefor.
Line 23, delete "norbomene" and insert -- norbornene --, therefor.
Line 28, delete "norbomene" and insert -- norbornene --, therefor.
Line 33, delete "norbomene" and insert -- norbornene --, therefor.
Line 35, delete "norbomene" and insert -- norbornene --, therefor.
Line 65, delete "norbomene" and insert -- norbornene --, therefor.
Line 67, delete "norbomene" and insert -- norbornene --, therefor.

Column 3,
Line 10, delete "norbomene" and insert -- norbornene --, therefor.
Line 16, delete "norbomene" and insert -- norbornene --, therefor.
Line 20, delete "Norbomene" and insert -- Norbornene --, therefor.
Line 27, delete "norbomene" and insert -- norbornene --, therefor.
Line 36, delete "norbomene" and insert -- norbornene --, therefor.
Line 41, delete "norbomene" and insert -- norbornene --, therefor.
Line 45, delete "norbomene" and insert -- norbornene --, therefor.
Line 52, delete "norbomene" and insert -- norbornene --, therefor.
Line 54, delete "Norbomene" and insert -- Norbornene --, therefor.
Line 57, delete "norbomene" and insert -- norbornene --, therefor.
Line 61, delete "norbomene" and insert -- norbornene --, therefor.

Column 4,
Line 17, delete "norbomene" and insert -- norbornene --, therefor.
Line 45, delete "norbomene" and insert -- norbornene --, therefor.
Line 49, delete "norbomene" and insert -- norbornene --, therefor.
Line 51, delete "norbomene" and insert -- norbornene --, therefor.
Line 60, delete "norbomene" and insert -- norbornene --, therefor.
Line 63, delete "norbomene" and insert -- norbornene --, therefor.

UNITED STATES PATENT AND TRADEMARK OFFICE
CERTIFICATE OF CORRECTION

| | |
|---|---|
| PATENT NO. | : 7,329,465 B2 |
| APPLICATION NO. | : 10/976675 |
| DATED | : February 12, 2008 |
| INVENTOR(S) | : Bert T. Chien |

It is certified that error appears in the above-identified patent and that said Letters Patent is hereby corrected as shown below:

Column 5,
Line 2, delete "norbomene" and insert -- norbornene --, therefor.
Line 26, delete "Norbomene" and insert -- Norbornene --, therefor.
Line 26, delete "norbomene" and insert -- norbornene --, therefor.
Line 28, delete "norbomene" and insert -- norbornene --, therefor.
Line 29, delete "norbomene" and insert -- norbornene --, therefor.
Line 31, delete "norbomene" and insert -- norbornene --, therefor.
Line 34, delete "norbomene" and insert -- norbornene --, therefor.
Lines 62-63, delete "norbomene" and insert -- norbornene --, therefor.
Line 65, delete "norbomene" and insert -- norbornene --, therefor.

Column 6,
Line 1, delete "norbomene" and insert -- norbornene --, therefor.
Line 4, delete "norbomene" and insert -- norbornene --, therefor.
Line 8, delete "norbomene" and insert -- norbornene --, therefor.
Line 37, delete "norbomene" and insert -- norbornene --, therefor.
Line 39, delete "norbomene" and insert -- norbornene --, therefor.
Lines 44-45, delete "norbomene" and insert -- norbornene --, therefor.
Line 49, delete "norbomene" and insert -- norbornene --, therefor.
Line 50, delete "norbomene" and insert -- norbornene --, therefor.

Column 7,
Line 45, delete "e.g," and insert -- e.g., --, therefor.
Line 64, delete "difuictional," and insert -- difunctional, --, therefor.

Column 8,
Line 14, delete "isobomyl" and insert -- isobornyl --, therefor.
Line 23, delete "pentaerthyitol" and insert -- pentaerythritol --, therefor.

Column 9,
Line 59, delete "fimctional" and insert -- functional --, therefor.

Column 10,
Line 56, delete "photoiniator" and insert -- photoinitiator --, therefor.

Column 11,
Line 28, delete "norbomene" and insert -- norbornene --, therefor.
Lines 56-57, delete "multifimctional" and insert -- multifunctional --, therefor.

UNITED STATES PATENT AND TRADEMARK OFFICE
CERTIFICATE OF CORRECTION

| | |
|---|---|
| PATENT NO. | : 7,329,465 B2 |
| APPLICATION NO. | : 10/976675 |
| DATED | : February 12, 2008 |
| INVENTOR(S) | : Bert T. Chien |

It is certified that error appears in the above-identified patent and that said Letters Patent is hereby corrected as shown below:

Column 12,
Line 28, delete "trifimctional" and insert -- trifunctional --, therefor.
Line 31, delete "norbomene" and insert -- norbornene --, therefor.
Line 36, delete "norbomene" and insert -- norbornene --, therefor.

Column 14,
Line 51, delete "$n_z$)" and insert -- ($n_z$) --, therefor.
Lines 51-52, delete "(nx and ny)." and insert -- ($n_x$ and $n_y$). --, therefor.

Column 15,
Line 44, delete "norbomene" and insert -- norbornene --, therefor.
Line 57, delete "norbomanediol;" and insert -- norbornanediol; --, therefor.

Column 17,
Line 3, delete "(MA)" and insert -- (MMA) --, therefor.
Line 16, delete "atatctic" and insert -- atactic --, therefor.
Line 17, delete "isotatctic" and insert -- isotactic --, therefor.
Line 53, delete "norbomene" and insert -- norbornene --, therefor.
Line 54, delete "norbomene" and insert -- norbornene --, therefor.
Line 56, delete "norbomene" and insert -- norbornene --, therefor.
Line 58, delete "norbomene" and insert -- norbornene --, therefor.
Line 60, delete "norbomene" and insert -- norbornene --, therefor.
Line 64, delete "norbomene" and insert -- norbornene --, therefor.

Column 18,
Line 54, delete "norbomene" and insert -- norbornene --, therefor.
Line 61, delete "norbomene" and insert -- norbornene --, therefor.

Column 19,
Line 22, delete "norbomene" and insert -- norbornene --, therefor.
Line 67, delete "norbomene" and insert -- norbornene --, therefor.

UNITED STATES PATENT AND TRADEMARK OFFICE
CERTIFICATE OF CORRECTION

PATENT NO. : 7,329,465 B2
APPLICATION NO. : 10/976675
DATED : February 12, 2008
INVENTOR(S) : Bert T. Chien It is certified that error appears in the above-identified patent and that said Letters Patent is hereby corrected as shown below:

Column 20,
Line 6, delete "norbomene" and insert -- norbornene --, therefor.
Lines 18-19, delete "norbomene" and insert -- norbornene --, therefor.
Line 21, delete "norbomene" and insert -- norbornene --, therefor.
Line 28, delete "Norbomene" and insert -- Norbornene --, therefor.
Line 35, delete "Norbomene" and insert -- Norbornene --, therefor.
Line 37, delete "norbomene" and insert -- norbornene --, therefor.
Line 38, delete "norbomene" and insert -- norbornene --, therefor.
Line 57, delete "olefm" and insert -- olefin --, therefor.

Column 23,
Line 15, delete "norbomene" and insert -- norbornene --, therefor.
Line 20, delete "norbomene" and insert -- norbornene --, therefor.
Line 21, delete "norbomene" and insert -- norbornene --, therefor.
Line 26, delete "norbomene" and insert -- norbornene --, therefor.
Line 31, delete "norbomene" and insert -- norbornene --, therefor.
Line 33, delete "norbomene" and insert -- norbornene --, therefor.
Line 37, delete "norbomene" and insert -- norbornene --, therefor.
Line 41, delete "norbomene" and insert -- norbornene --, therefor.
Line 47, delete "norbomene" and insert -- norbornene --, therefor.
Line 51, delete "norbomene" and insert -- norbornene --, therefor.

Column 24,
Line 59, delete "norbomene" and insert -- norbornene --, therefor.

Column 25,
Line 58, delete "additiona" and insert -- additional --, therefor.

Column 26,
Line 23, delete "SE 800" and insert -- SE800 --, therefor.
Line 42, delete "norbornene based" and insert -- norbornene-based --, therefor.
Line 51, delete "norbomene" and insert -- norbornene --, therefor.
Line 52, delete "PR 650" and insert -- PR650 --, therefor.
Line 53, delete "research" and insert -- Research --, therefor.
Line 59, delete "an$_y$" and insert -- any --, therefor.
Line 62, delete "norbomene" and insert -- norbornene --, therefor.
Line 65, delete "norbomene" and insert -- norbornene --, therefor.
Line 67, delete "norbomene based" and insert -- norbornene-based --, therefor.

UNITED STATES PATENT AND TRADEMARK OFFICE
CERTIFICATE OF CORRECTION

PATENT NO. : 7,329,465 B2
APPLICATION NO. : 10/976675
DATED : February 12, 2008
INVENTOR(S) : Bert T. Chien It is certified that error appears in the above-identified patent and that said Letters Patent is hereby corrected as shown below:

Column 27,
Line 28, in Claim 5, delete "ethlyenically" and insert -- ethylenically --, therefor.
Lines 28-29 in Claim 5, delete "ethlyenically" and insert -- ethylenically --, therefor.

Signed and Sealed this

Twenty-second Day of July, 2008

JON W. DUDAS
*Director of the United States Patent and Trademark Office*